United States Patent
Xu et al.

(10) Patent No.: US 11,557,959 B2
(45) Date of Patent: Jan. 17, 2023

(54) DEADTIME AUTOMATIC-OPTIMIZATION SYSTEM FOR FLYBACK POWER SUPPLY HAVING PRIMARY-SIDE FEEDBACK IN CCM, CONTROL SYSTEM AND METHOD FOR FLYBACK POWER SUPPLY HAVING PRIMARY-SIDE FEEDBACK IN CCM

(71) Applicants: CSMC TECHNOLOGIES FAB2 CO., LTD., Wuxi New District (CN); SOUTHEAST UNIVERSITY, Xuanwu District Nanjing (CN)

(72) Inventors: Shen Xu, Wuxi New District (CN); Minggang Chen, Wuxi New District (CN); Hao Wang, Wuxi New District (CN); Jinyu Xiao, Wuxi New District (CN); Wei Su, Wuxi New District (CN); Weifeng Sun, Wuxi New District (CN); Longxing Shi, Wuxi New District (CN)

(73) Assignees: CSMC TECHNOLOGIES FAB2 CO., LTD., Wuxi New District (CN); SOUTHEAST UNIVERSITY, Xuanwu District Nanjing (CN)

( * ) Notice: Subject to any disclaimer, the term of this patent is extended or adjusted under 35 U.S.C. 154(b) by 71 days.

(21) Appl. No.: 16/959,015

(22) PCT Filed: Dec. 29, 2018

(86) PCT No.: PCT/CN2018/125640
§ 371 (c)(1),
(2) Date: Jun. 29, 2020

(87) PCT Pub. No.: WO2019/129279
PCT Pub. Date: Jul. 4, 2019

(65) Prior Publication Data
US 2020/0343810 A1  Oct. 29, 2020

(30) Foreign Application Priority Data

Dec. 29, 2017 (CN) .......................... 201711474037.8

(51) Int. Cl.
*H02M 1/38* (2007.01)
*H02M 1/08* (2006.01)
(Continued)

(52) U.S. Cl.
CPC ............ *H02M 1/38* (2013.01); *H02M 1/083* (2013.01); *H02M 3/33592* (2013.01);
(Continued)

(58) Field of Classification Search
CPC ............ H02M 1/0009; H02M 1/0012; H02M 1/0025; H02M 1/0038; H02M 1/0048;
(Continued)

(56) References Cited

U.S. PATENT DOCUMENTS 10,027,235 B2    7/2018  Choi et al.
2010/0164455 A1*  7/2010  Li ..................... H02M 3/157
                                             323/283
(Continued)

FOREIGN PATENT DOCUMENTS

CN    203166766 U   8/2013
CN    104009655 A   8/2014
(Continued)

OTHER PUBLICATIONS

Unpublished U.S. Appl. No. 16/915,524, filed Jun. 29, 2020.
(Continued)

*Primary Examiner* — Thienvu V Tran
*Assistant Examiner* — Carlos O Rivera-Perez
(74) *Attorney, Agent, or Firm* — Kagan Binder, PLLC

(57) ABSTRACT

An automatic dead zone time optimization system in a primary-side regulation flyback power supply continuous
(Continued)

conduction mode (CCM), including a closed loop formed by a control system, including a single output digital to analog converter (DAC) midpoint sampling module, a digital control module, a current detection module, a dead zone time calculation module and a pulse-width modulation (PWM) driving module, and a controlled synchronous rectification primary-side regulation flyback converter. A primary-side current is sampled using a DAC Sampling mechanism to calculate a secondary-side average current, so as to obtain a primary-side average current and a secondary-side average current, in the case of CCM. A secondary-side current is input into the dead zone time calculation module to obtain a reasonable dead zone time; and the PWM driving module is jointly controlled by a primary-side regulation loop and the obtained dead zone time.

16 Claims, 6 Drawing Sheets

(51) Int. Cl.
  *H02M 3/335* (2006.01)
  *H02M 1/00* (2006.01)
(52) U.S. Cl.
  CPC ........ *H02M 1/0009* (2021.05); *H02M 1/0048* (2021.05); *H02M 1/385* (2021.05)
(58) Field of Classification Search
  CPC .... H02M 1/0051; H02M 1/0058; H02M 1/08; H02M 1/082; H02M 1/083; H02M 1/0845; H02M 1/38; H02M 1/385; H02M 3/00; H02M 3/22; H02M 3/24; H02M 3/28; H02M 3/315; H02M 3/3155; H02M 3/335; H02M 3/33507; H02M 3/33515; H02M 3/33523; H02M 3/3353; H02M 3/33538; H02M 3/33546; H02M 3/33553; H02M 3/33576; H02M 3/33584; H02M 3/33592; Y02B 70/10
  USPC ........ 363/15–21.18; 323/235, 271–277, 280, 323/282–288, 351
  See application file for complete search history.

(56) References Cited

U.S. PATENT DOCUMENTS

2014/0133191 A1   5/2014   Wang et al.
2016/0380533 A1   12/2016   Jin et al.

FOREIGN PATENT DOCUMENTS

| CN | 104901541 A | 9/2015 |
| CN | 105811780 A | 7/2016 |
| CN | 107026572 A | 8/2017 |
| CN | 107147300 A | 9/2017 |
| CN | 107154723 A | 9/2017 |
| WO | 2019129270 A1 | 7/2019 |
| WO | 2019129273 A1 | 7/2019 |

OTHER PUBLICATIONS

Unpublished U.S. Appl. No. 16/958,868, filed Jun. 29, 2020.
Chinese Office Action for Chinese Counterpart Application No. 201711474037.8, dated Aug. 4, 2020, (6 pages).
International Search Report, and English Translation thereof, for International Application No. PCT/CN2018/125640, dated Apr. 4, 2019 (4 pages).

\* cited by examiner

DEADTIME AUTOMATIC-OPTIMIZATION SYSTEM FOR FLYBACK POWER SUPPLY HAVING PRIMARY-SIDE FEEDBACK IN CCM, CONTROL SYSTEM AND METHOD FOR FLYBACK POWER SUPPLY HAVING PRIMARY-SIDE FEEDBACK IN CCM

CROSS-REFERENCE OF RELATED APPLICATIONS

This application is the National Stage of International Application No. PCT/CN2018/125640, filed Dec. 29, 2018, entitled "AUTOMATIC DEAD ZONE TIME OPTIMIZATION SYSTEM IN PRIMARY-SIDE-REGULATION FLYBACK POWER SUPPLY CCM MODE, AND CONTROL SYSTEM AND METHOD IN PRIMARY-SIDE-REGULATION FLYBACK POWER SUPPLY CCM MODE", which claims priority to Chinese Patent Application No. 201711474037.8, filed on Dec. 29, 2017, which is incorporated by reference herein for all purposes.

TECHNICAL FIELD

The present disclosure relates to a flyback switching power supply using a synchronous-rectification primary-side feedback, and particularly relates to a deadtime automatic-optimization system of the flyback power supply using the synchronous-rectification primary-side feedback in a continuous conduction mode (CCM), which belongs to the field of isolated switch-mode-power-supply converter technologies. The present disclosure further relates to a control system of a flyback power supply having a primary-side feedback in a CCM, and a method thereof.

BACKGROUND

The statements herein provide only background information related to the present disclosure, and do not necessarily constitute exemplary techniques.

Power supply is an indispensable part of every single electronic device. The performance of the power supply is directly related to the technical specifications of the electronic device and whether the electronic device can work safely and reliably, and the current mainstream application is a switch mode power supply. A switch mode power supply, also known as a switching converter, is a power supply that uses modern power electronics technology to make the output voltage constant by adjusting the conduction ratio of switching devices.

Since a flyback converter has a dual-function of a transformer and an inductor, the flyback converter does not require an output filter inductor, which is especially important to reduce the volume and the costs. Therefore, the topology of the flyback converter is widely applied.

In a conventional flyback switching converter, a diode rectification method is used, as shown in FIG. 1. For the application of high-power power supply systems, the loss on rectifier diodes has become a bottleneck for improving system efficiency. To this end, a synchronous rectification structure having higher efficiency is provided.

The synchronous rectification is a new technology for replacing a rectifier diode with a metal oxide semiconductor field-effect transistor (MOSFET) having an extremely low on-resistance, which is generally applied to scenarios with low voltages and high current. For the purpose of improving efficiency and reducing losses, the use of the synchronous rectification technology has become necessary means. A synchronous rectifier has a lower on-resistance and less forward voltage drop, resulting in low rectification losses and meeting current design requirements.

A synchronous-rectification structure is shown in FIG. 2. Gates of a primary-side switching transistor SW and a secondary-side rectifier SR are driven by two voltages having opposite timings, that is, when the switching transistor SW is turned on, the rectifier SR is turned off, and when the switching transistor SW is turned off, the rectifier SR is turned on. When the switching transistor SW is turned on and the rectifier SR is turned off, the input voltage $V_{in}$ linearly increases the current through the inductor L, and the inductor begins to store energy. When the rectifier SR is turned on and the switching transistor SW is turned off, the energy stored in the primary-side inductor is coupled to the secondary side through the transformer to supply power to the load and the output capacitor.

In order to avoid the breakdown phenomenon caused by a simultaneous turning-on of the primary-side switching transistor and the secondary-side switching transistor during the switching between the primary-side and secondary-side switches of the flyback converter, it must ensure that a deadtime is interposed between the primary-side and secondary-side switching transistors. That is, the secondary-side switching transistor can be turned on only after the primary-side switching transistor is turned off; the primary-side switching transistor can be turned on only after the secondary-side switching transistor is turned off According to whether the secondary-side current $I_s$ drops to 0 when the primary-side switching transistor is turned on next time, the operating state of the flyback converter can be divided into a Continuous Conduction Mode (CCM) and a Discontinuous Conduction Mode (DCM). When the primary-side switching transistor is off and before the secondary-side rectifier is turned on, the CCM and the DCM have a conduction loss of a parasitic diode. When the secondary-side rectifier is off and before the primary-side switching transistor is turned on, the CCM increases the loss due to the parasitic diode and the reverse recovery of the diode. In the DCM, since the secondary-side current $I_s$ has dropped to 0 before the secondary-side rectifier is turned off, the losses of the parasitic diode and the reverse recovery of the diode are not present. Therefore, the efficiency of the CCM is lower than the efficiency of the DCM under the same conditions.

At the same power level, the peak current in the DCM is 2 to 3 times than the peak current in the CCM. Moreover, the DCM will generate a large output voltage spike at the instant that the output synchronous rectifier is turned off, thereby requiring a large LC filter, which may cause serious radio frequency interference (RFI) problems. Furthermore, oscillations may occur when the operating state is changed from the DCM to the CCM, thereby causing the circuit unstable. Therefore, under certain situations (such as having smaller peak current), the CCM can function better.

The main problem of the current flyback switching power supply having the synchronous-rectification in the CCM is that during the deadtime between the turn-off of the secondary-side rectifier and the turn-on of the primary-side switching transistor, there are serious conduction loss of the parasitic diode and loss of the reverse recovery of the diode. In view of the problem, the present disclosure provides a corresponding optimization solution.

SUMMARY

According to various embodiment of the present disclosure, a deadtime automatic-optimization system of a flyback power supply having a primary-side feedback in a CCM is provided.

A deadtime automatic-optimization system of a flyback power supply having a primary-side feedback in a CCM is provided, which includes a control system consisting of a single-output digital to analog converter (DAC) midpoint sampling module, a digital control module, a current detection module, a deadtime calculation module, and a pulse-width modulation (PWM) driving module. The control system forms a closed loop with a main topology of a controlled flyback converter having a synchronous-rectification primary-side feedback. The single-output DAC midpoint sampling module samples a voltage signal $V_{sense}(t_{mid})$ on an auxiliary winding at an instant $T_r/2$, that is, at a midpoint instant of a secondary-side current reset time $T_r$, to output to the digital control module. The digital control module calculates an error $e(n)$ between the voltage signal $V_{sense}(t_{mid})$ and a system-predetermined fixed value $V_{REF}$ and calculates an input voltage control amount $V_c(n)$ for the PWM driving module by using proportion and integration to output to the PWM driving module. In addition, the digital control module outputs a digital value $V_{peak\_d}$ of a peak voltage on a primary-side current sampling resistor $R_{cs}$ according to a value of the error $e(n)$. The digital value $V_{peak\_d}$ and a voltage $V_{cs}$ at two terminals of the primary-side current sampling resistor $R_{cs}$ are output to the current detection module. The current detection module indirectly samples and calculates through a DAC in a pure digital manner to obtain a primary-side average current $I_{mid\_p}$ and a secondary-side average current $I_s(t_{mid})$ in the CCM, and outputs the secondary-side average current $I_s(t_{mid})$ as an output signal to the deadtime calculation module to calculate a reasonable deadtime $t_d$ between a turn-off of a secondary-side rectifier SR and a turn-on of a primary-side switching transistor SW. The PWM driving module generates duty cycle control signals duty and duty_SR under a common control of the deadtime $t_d$ output by the deadtime calculation module and the control amount $V_c(n)$ output by the digital control module. The duty cycle control signals duty and duty_SR control switching of the primary-side switching transistor SW and the secondary-side synchronous rectifier SR, respectively, thereby achieving an automatic optimization of the deadtime of the flyback power supply having the synchronous-rectification primary-side feedback in the CCM.

The present disclosure further provides a control system and method of a flyback power supply having a primary-side feedback in a CCM.

A control system of a flyback power supply having a primary-side feedback in a CCM is provided. The flyback power supply having the primary-side feedback includes a primary side of a transformer, a secondary side of the transformer, and an auxiliary winding. The primary side includes a primary-side winding, a primary-side switching transistor, and a primary-side current sampling resistor that is connected in series to the primary-side switching transistor. The secondary side includes a secondary-side winding and a secondary-side rectifier. The control system includes: a single-output DAC midpoint sampling module sampling a voltage signal $V_{sense}(t_{mid})$ on the auxiliary winding at a midpoint instant $T_r/2$ of a secondary-side current reset time $T_r$; a digital control module calculating an error $e(n)$ between the voltage signal $V_{sense}(t_{mid})$ and a predetermined fixed value $V_{REF}$, calculating an input voltage control amount $V_c(n)$ for a PWM driving module by using proportion and integration according to the error $e(n)$, and obtaining a digital value $V_{peak\_d}$ of a peak voltage on the primary-side current sampling resistor $R_{cs}$ according to the error $e(n)$; a current detection module indirectly sampling and calculating through a digital-to-analog conversion according to the digital value $V_{peak\_d}$ and a voltage $V_{cs}$ at two terminals of the primary-side current sampling resistor $R_{cs}$ to obtain a primary-side average current $I_{mid\_p}$ and a secondary-side average current $I_s(t_{mid})$ in the CCM; a deadtime calculation module calculating a deadtime $t_d$ between a turn-off of the secondary-side rectifier and a turn-on of the primary-side switching transistor according to the secondary-side average current $I_s(t_{mid})$; and the PWM driving module generating a primary-side duty cycle control signal duty and a secondary-side duty cycle control signal duty_SR according to the deadtime $t_d$ and the input voltage control amount $V_c(n)$, and controlling switching of the primary-side switching transistor according to the primary-side duty cycle control signal duty, and controlling switching of the secondary-side rectifier according to the secondary-side duty cycle control signal duty_SR.

A method of controlling a flyback power supply having a primary-side feedback in a CCM is provided. The flyback power supply having the primary-side feedback includes a primary side of a transformer, a secondary side of the transformer, and an auxiliary winding. The primary side includes a primary-side winding, a primary-side switching transistor, and a primary-side current sampling resistor that is connected in series to the primary-side switching transistor. The secondary side includes a secondary-side winding and a secondary-side rectifier. The method includes: sampling a voltage signal $V_{sense}(t_{mid})$ on the auxiliary winding at a midpoint instant $T_r/2$ of a secondary-side current reset time $T_r$; calculating an error $e(n)$ between the voltage signal $V_{sense}(t_{mid})$ and a predetermined fixed value $V_{REF}$, calculating an input voltage control amount $V_c(n)$ for a PWM driving module by using proportion and integration according to the error $e(n)$, and obtaining a digital value $V_{peak\_d}$ of a peak voltage on the primary-side current sampling resistor $R_{cs}$ according to the error $e(n)$; indirectly sampling and calculating to obtain a primary-side average current $I_{mid\_p}$ and a secondary-side average current $I_s(t_{mid})$ in the CCM through a digital-to-analog conversion according to the digital value $V_{peak\_d}$ and a voltage $V_{cs}$ at two terminals of the primary-side current sampling resistor $R_{cs}$; calculating a deadtime $t_d$ between a turn-off of the secondary-side rectifier and a turn-on of the primary-side switching transistor according to the secondary-side average current $I_s(t_{mid})$; generating, by the PWM driving module, a primary-side duty cycle control signal duty and a secondary-side duty cycle control signal duty_SR according to the deadtime $t_d$ and the input voltage control amount $V_c(n)$; and controlling switching of the primary-side switching transistor according to the primary-side duty cycle control signal duty, and controlling switching of the secondary-side rectifier according to the secondary-side duty cycle control signal duty_SR.

Details of one or more embodiments of the present disclosure are set forth in the accompanying drawings and description below. Other features, objects, and advantages of the present disclosure will become thorough from the description, the drawings, and the claims.

BRIEF DESCRIPTION OF THE DRAWINGS

In order to illustrate the technical solutions in the embodiments of the present disclosure more clearly, the drawings used in the description of the embodiments will be briefly introduced below. Apparently, the drawings in the following description are merely some embodiments of the present disclosure. For those skilled in the art, drawings of other embodiments can be obtained according to these drawings, without any creative efforts.

DETAILED DESCRIPTION OF THE EMBODIMENTS

In order to make the objectives, features, and advantages of the present disclosure more comprehensible, the specified embodiments of the present disclosure will be illustrated in detail with reference to the accompanying drawings.

Figure 1:
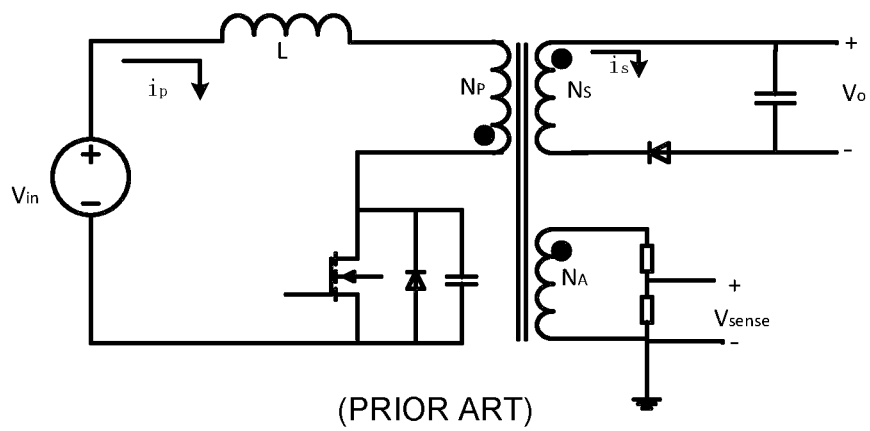
FIG. 1 shows a circuit diagram of a conventional flyback switching converter having a primary-side feedback using a diode rectification method.

FIG. 1 shows a circuit diagram of a conventional flyback switching converter having a primary-side feedback and using a diode rectification method. In a conventional flyback switching converter, a diode rectification method is used, as shown in FIG. 1. For the application of high-power power supply systems, the loss on rectifier diodes has become a bottleneck for improving system efficiency. To this end, a synchronous rectification structure having higher efficiency is provided.

The synchronous rectification is a new technology for replacing a rectifier diode with a MOSFET having an extremely low on-resistance, which is generally applied to scenarios with low voltages and high current. A synchronous rectifier has a lower on-resistance and less forward voltage drop, resulting in low rectification losses and meeting current design requirements.

Figure 2:
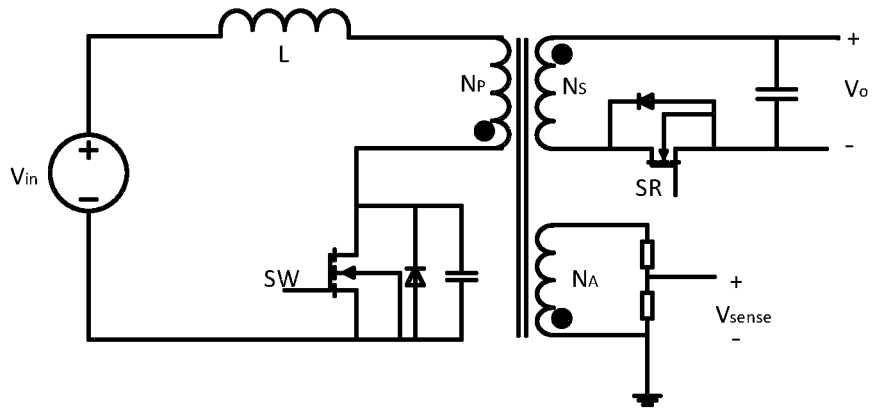
FIG. 2 shows a circuit diagram of a flyback switching converter having a primary-side feedback using a MOSFET switching transistor rectification method having a low on-resistance.

FIG. 2 shows a circuit diagram of the flyback switching converter having the primary-side feedback and using a MOSFET switching transistor rectification method having a low on-resistance. Gates of a primary-side switching transistor SW and a secondary-side rectifier SR are driven by two voltages having opposite timings, that is, when the switching transistor SW is turned on, the rectifier SR is turned off, or when the switching transistor SW is turned off, the rectifier SR is turned on. When the switching transistor SW is turned on and the rectifier SR is turned off, the input voltage yin linearly increases the current through an inductor L, and the inductor begins to store energy. When the rectifier SR is turned on and the switching transistor SW is turned off, the energy stored in the primary-side inductor is coupled to the secondary side through the transformer to supply power to the load and the output capacitor.

Figure 3:
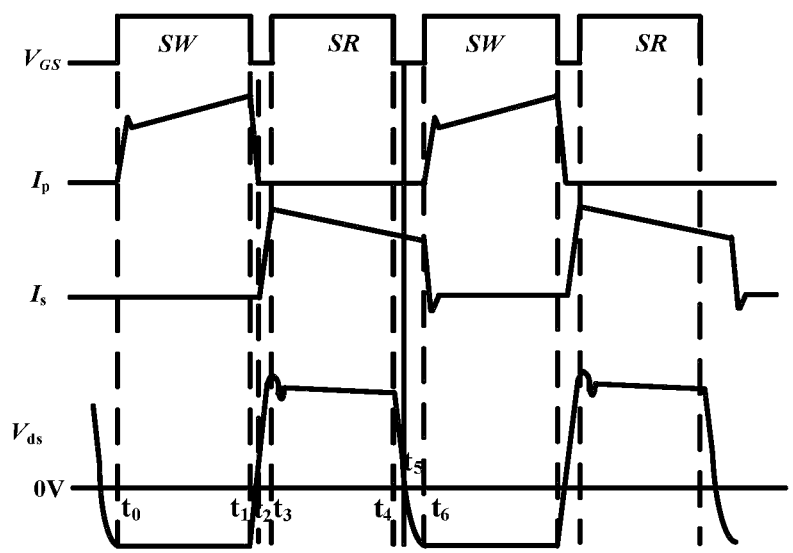
FIG. 3 shows waveforms of main signals of a flyback converter having a synchronous-rectification primary-side feedback in a CCM.

In order to avoid the breakdown phenomenon caused by a simultaneous turning-on of the primary-side switching transistor and the secondary-side switching transistor during the switching between the primary-side and secondary-side switches of the flyback converter, it must ensure that a deadtime is interposed between the primary-side and secondary-side switching transistors. That is, the secondary-side switching transistor can be turned on only after the primary-side switching transistor is turned off; the primary-side switching transistor can be turned on only after the secondary-side switching transistor is turned off FIG. 3 shows waveforms of main signals of the flyback converter having the synchronous-rectification primary-side feedback in the CCM. FIG. 3 shows the waveforms of the main signals of the flyback converter having the synchronous-rectification primary-side feedback in the CCM, in order to facilitate the analysis, an operating cycle is divided into a plurality of different phases as below.

At an instant $t_0$, a primary-side switching transistor SW is turned on, a primary-side current $I_p$ flows through a primary-side inductor $L_m$ and the primary-side switching transistor SW, and the primary-side current $I_p$ increases linearly. In a period between $t_0$ to $t_1$, the primary-side switching transistor SW is turned on, and a voltage $V_{ds}^{sw}$ at two terminals thereof is zero.

At the instant $t_1$, the primary-side switching transistor SW is turned off. An equivalent parasitic capacitor $C_{eqp}$ at the two terminals of the switching transistor is charged by the excitation current $I_p$, until the value of the voltage $V_{ds}^{sw}$ at the two terminals of the primary-side switching transistor SW reaches $V_{in}+NV_o$ at the instant $t_2$.

In a period between $t_1$ and $t_3$, a secondary-side switching transistor SR is not turned on yet. At the instant $t_2$, the primary-side current $I_p$ drops to zero, and primary-side energy is transferred to the secondary side through a transformer. At this instant, the secondary-side switching transistor SR is still in the off state, a parasitic diode $D_R$ is turned on, and a secondary-side current $I_S$ increases quickly. Since the on-resistance of the parasitic diode $D_R$ is much greater than the on-resistance of the MOSFET of the secondary-side switching transistor SR, the secondary-side current $I_S$ flowing through the parasitic diode $D_R$ will cause a large conduction loss of the diode, resulting in a decrease in the efficiency of the flyback converter, and therefore the deadtime of $t_1$ to $t_3$ should be as small as possible.

In a period between $t_3$ and $t_4$, the secondary-side switching transistor SR is turned on. The secondary-side current $I_S$ flows through the MOSFET, rather than through the parasitic diode $D_R$. The on-resistance of the MOSFET of the secondary-side switching transistor SR is extremely low, thereby greatly reducing the conduction loss.

At an instant $t_4$, the secondary-side switching transistor SR is turned off. In a period between $t_4$ and $t_5$, the MOSFET of the secondary-side switching transistor SR is off, and the current flows through the parasitic diode $D_R$ of the MOSFET. When the primary-side switching transistor SW is turned on at the instant $t_6$, the voltage drop at the two terminals of the parasitic diode suddenly changes from forward to reverse, and a reverse recovery current can be generated in the process, which causes a reverse recovery loss of the parasitic diode $D_R$. Therefore, in order to reduce the reverse recovery loss of the parasitic diode $D_R$ in the CCM, the deadtime of $t_4$ to $t_5$ should be as small as possible.

Figure 4:
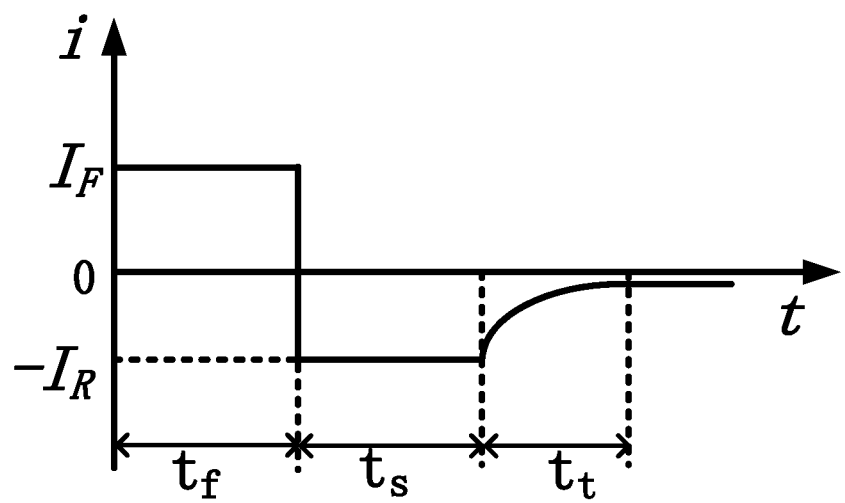
FIG. 4 shows a curve of current changes over time during a reverse recovery of a parasitic diode.

FIG. 4 shows a curve of current changes over time during the reverse recovery of the parasitic diode. As shown in FIG. 4, in a forward conduction period $t_f$, a value of the current flowing through the parasitic diode $D_R$ is $I_F$. When the voltage drop at the two terminals of the parasitic diode $D_R$ changes from a forward voltage $V_F$ to a reverse voltage $V_R$, so the current changes from the forward current $I_F$ to a reverse current $I_R$, and remains constant in a storing time $t_s$. Then, the current gradually drops to 0.1 of $I_R$ in a transit time $t_t$. At this instant of the end of the transit time $t_t$, the value of the reverse current is negligible. Namely, only when the storing time $t_s$ and the transit time $t_t$ have lapsed, does the parasitic diode $D_R$ enter a reverse off-state. This is due to the charge storage effect of the PN junction of the parasitic diode $D_R$. During the forward conduction, a certain number of unbalanced minority carriers are accumulated in the PN junction of the parasitic diode $D_R$. When the voltage drop at the two terminals changes from forward to reverse, the stored unbalanced minority carriers do not disappear immediately, but instead, form a reverse drift current and are gradually consumed by being compounded with the majority carriers. This time is the reverse recovery time of the parasitic diode $D_R$. In this process, the reverse recovery current will be generated, thereby causing the reverse recovery loss of the parasitic diode $D_R$.

Figure 5:
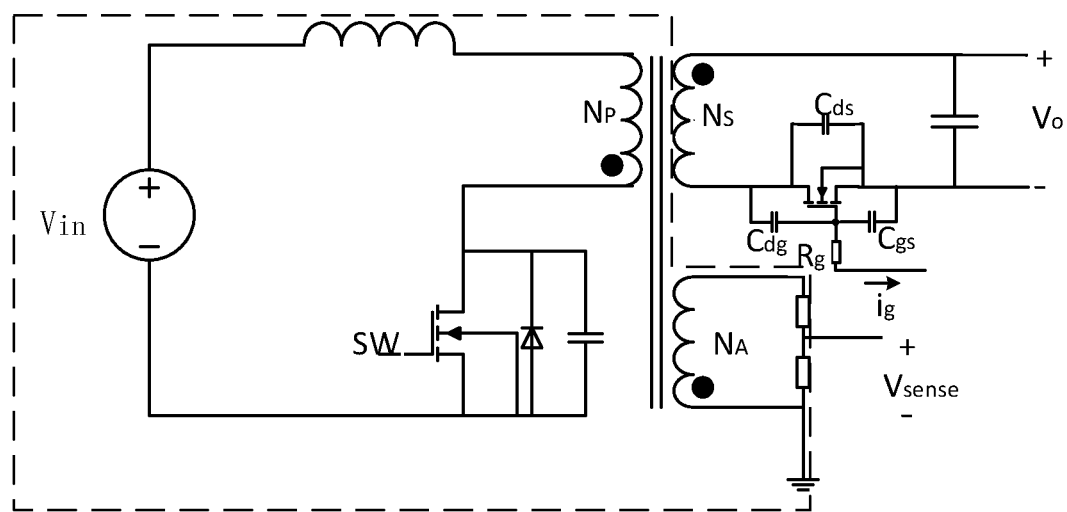
FIG. 5 shows an operating circuit diagram of a turn-off delay phase.

FIG. 5 shows an operating circuit diagram of a turn-off delay phase. The portion in the dashed box is not considered in this phase. At the instant $t_4$, a square wave drive signal for the gate of the secondary-side switching transistor SR drops from a high level to zero. The transistor SR starts to enter the turn-off process. A gate current $i_g$ discharges $C_{gs}$, and charges $C_{dg}$. $U_{gs}$ starts to drop. In this period, the decay time constant of $U_{gs}$ is $\tau=R_g(C_{dg}+C_{gs})$, and the transistor SR remains on. $I_s$ in the transistor SR is divided into $i_{ch}$ flowing through the channel, $i_{ds}$ flowing through $C_{ds}$, and $i_{dg}$ flowing through $C_{dg}$. Since $i_{ds}$ and $i_{dg}$ are significantly less than $I_s$ in this phase, it can be considered that $i_{ch} \approx I_s$ and $U_{gs} \approx I_s R_{ds}$, in which $R_{ds}$ is the drain-source on-resistance of the transistor SR. At the instant $t_5$, $U_{gs}=I_s R_{ds}+U_T$, in which $U_T$ is a threshold voltage of the MOSFET. The transistor SR is transformed from an unsaturated region (linear resistance region) to a saturated region to operate. When the Miller effect occurs, this process ends. This phase is the turn-off delay phase of the turn-off process of the MOSFET.

Figure 6:
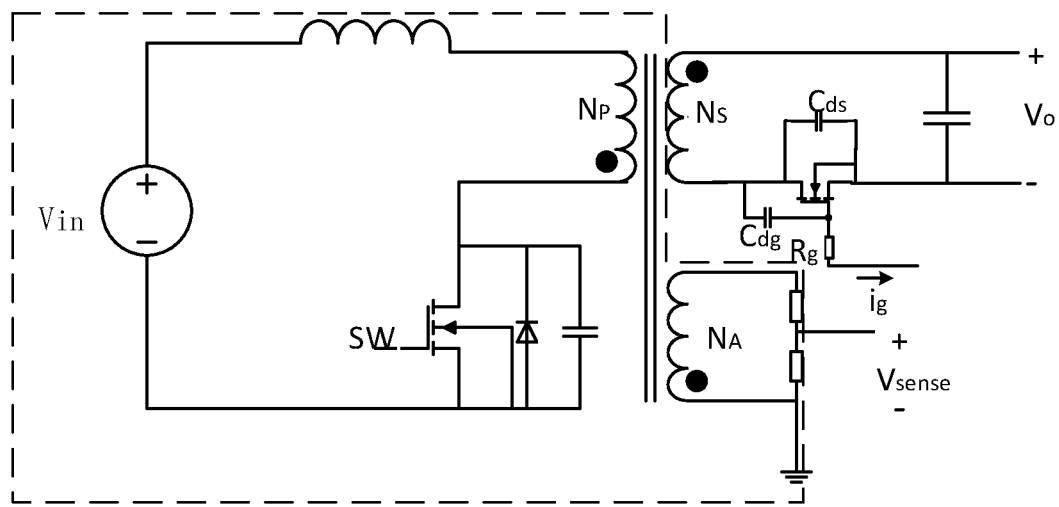
FIG. 6 shows an operating circuit diagram of a Miller effect phase.

FIG. 6 shows an operating circuit diagram of the Miller effect phase. The portion in the dashed box is not considered in this phase. In view of the presence of the Miller effect, $U_{gs}$ remains substantially constant and departs from the original trajectory in this phase. The value of $U_{gs}$ is referred to a Miller plateau voltage, which is denoted by $U_p$. It is readily known from the analysis in the previous phase that $U_p \approx I_s R_{ds}+U_T$. In addition, $C_{gs}$ does not discharge any more, and $i_g$ completely flows through $C_{dg}$ and causes $U_{dg}$ to increase. Since $i_g$ is small and $U_{ds}=U_p+U_{dg}$, $U_{ds}$ slowly rises and arrives at $U_X$ at the instant $t_6$. At this instant, the N⁻ epitaxial layer of the transistor SR changes from depletion to accumulation. The channel is turned off, and $i_{ch}=0$. Therefore, $I_s$ flows only through $C_{ds}$ and $C_{dg}$. $U_X$ is an important parameter for analyzing the switching process of the MOSFET. Although most MOSFET datasheets fail to give $U_X$, it can be measured through simple test experiments. This phase is the Miller effect phase in the turn-off process of the MOSFET, and the sum of the duration of the Miller effect phase and the duration of the turn-off delay phase is the turn-off time of the MOSFET.

Figure 7:
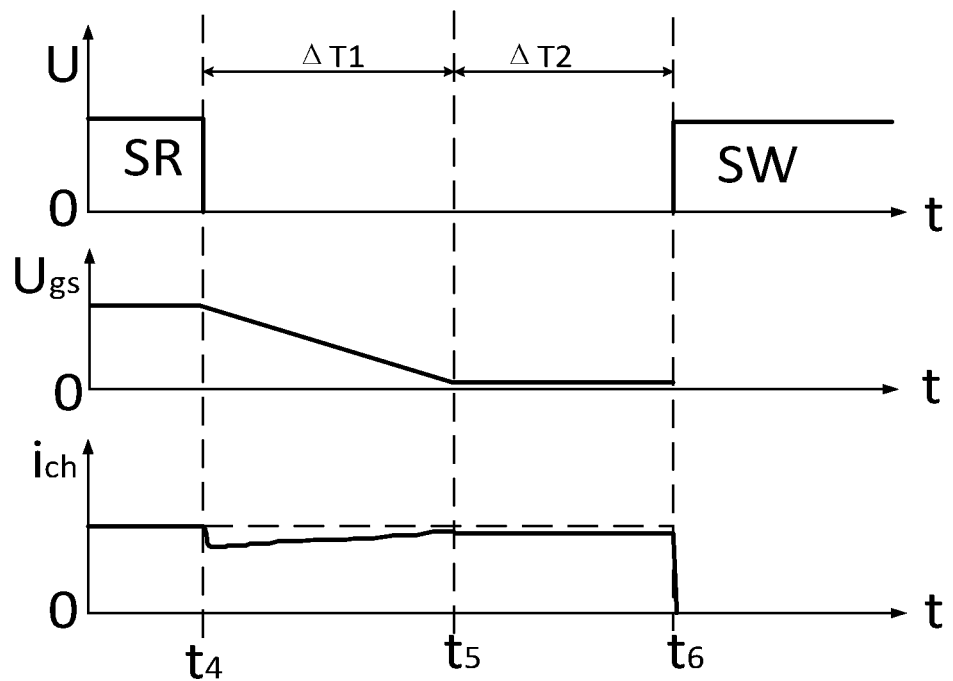
FIG. 7 shows waveforms of main signals during a turn-off of a secondary-side rectifier.

FIG. 7 shows waveforms of main signals during a turn-off of a secondary-side rectifier. At the instant $t_4$, a square wave drive signal for the gate of the secondary-side switching transistor SR drops from a high level to zero. The transistor SR starts to enter the turn-off process. A gate current $i_g$ discharges the gate-source capacitor $C_{gs}$, and charges the gate-drain capacitor $C_{dg}$. $U_{gs}$ starts to drop. In this period, the decay time constant of $U_{gs}$ is $\tau=R_g(C_{dg}+C_{gs})$, and the transistor SR remains on. $I_s$ in the transistor SR is divided into $i_{ch}$ flowing through the channel, $i_{ds}$ flowing through $C_{ds}$, and $i_{dg}$ flowing through $C_{dg}$. Since $i_{ds}$ and $i_{dg}$ are significantly less than $I_s$ in this phase, it can be considered that $i_{ch} \approx I_s$ and $U_{gs} \approx I_s R_{ds}$, in which $R_{ds}$ is the drain-source on-resistance of the transistor SR. At the instant $t_5$, $U_{gs}=I_s R_{ds}+U_T$, in which $U_T$ is a threshold voltage of the MOSFET. The transistor SR is transformed from an unsaturated region (linear resistance region) to a saturated region to operate. When the Miller effect occurs, this process ends. This phase is the turn-off delay phase of the turn-off process of the MOSFET.

In view of the presence of the forward conduction loss and the reverse recovery loss of the parasitic diode of the conventional flyback converter having the synchronous-rectification primary-side feedback in the CCM, the present disclosure provides a deadtime automatic-optimization system in the CCM, which can reasonably optimize the deadtime, thereby minimizing the forward conduction loss and the reverse recovery loss of the parasitic diode. According to the present disclosure, the primary-side current is sampled to calculate the secondary-side average current through a digital to analog converter (DAC) sampling mechanism, to obtain a primary-side average current $I_{mid\_p}$ and a secondary-side average current $I_s(t_{mid})$ in the CCM. Then, the secondary-side average current is input into a deadtime calculation module, so that a reasonable deadtime $t_d$ is obtained. Finally, a PWM driving module is controlled by a primary-side feedback loop and the obtained deadtime $t_d$ together to generate a drive signal duty for the primary-side switching transistor and a drive signal duty_SR for the secondary-side rectifier, so that the deadtime between the turn-off of the secondary-side rectifier and the turn-on of the primary-side switching transistor in the CCM can be reasonably optimized.

Figure 8:
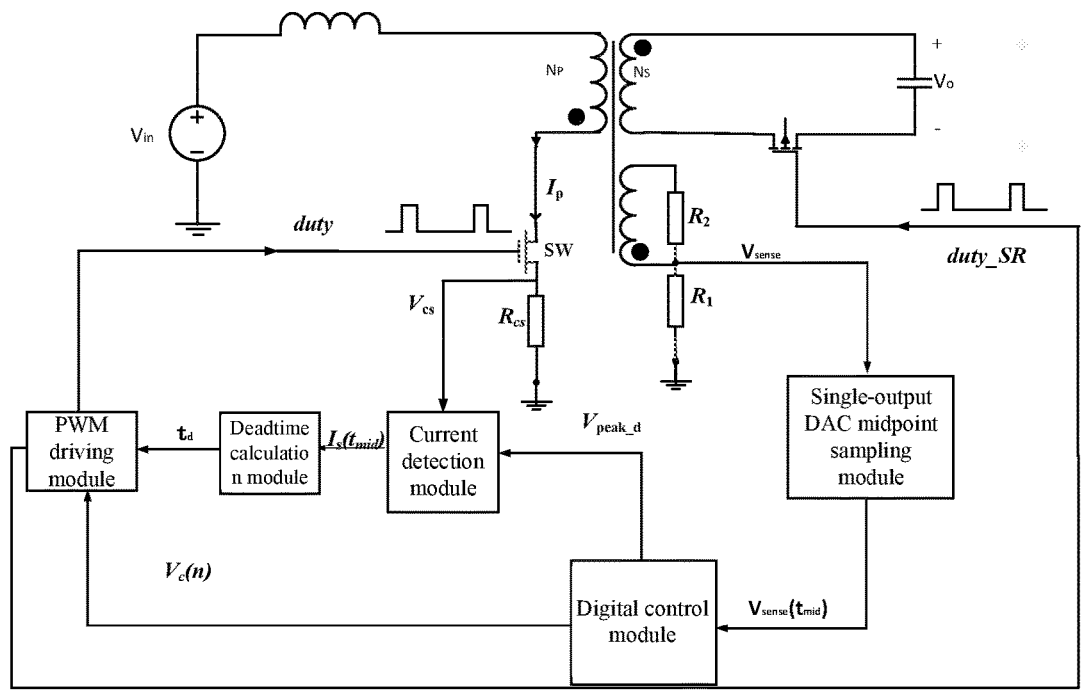
FIG. 8 shows a circuit diagram of an overall implementation of a deadtime automatic-optimization system of a flyback switching converter having a primary-side feedback in a CCM using a synchronous-rectification method according to the present disclosure.

FIG. 8 shows a block diagram of a deadtime automatic-optimization solution of a flyback switching converter having a primary-side feedback in the CCM using the synchronous-rectification method according to the present disclosure. Compared with a conventional diode rectification method, the present disclosure is based on the main topology of the flyback converter using the synchronous-rectification method. The topology includes the primary-side switching transistor, the secondary-side rectifier, and the transformer. The deadtime optimization system in the CCM includes a current detection module, a deadtime calculation module, a PWM driving module, a single-output DAC midpoint sampling module, and a digital control module. The present disclosure provides a scheme for automatically optimizing deadtime in a pure digital control manner according to different operating conditions. As shown in the figures, under the main topology of the primary-side feedback, the single-output DAC midpoint sampling module of the control system accurately and carefully generates a digital value of an initial voltage $V_{initial}$ of a single slope digital wave through an internal feedback amount calculation module according to a result of continuous comparison of $\Delta t_{r\_half}$ and $T_s/2$ in each switching cycle. The digital value of the initial voltage $V_{initial}$ is configured for a triangular wave generator to generate a digital single sloping wave, which is superimposed on an analog reference voltage generated by the DAC to form the single slope digital wave $V_{ref\_slope}$. Finally, a comparator is used to compare the sampled slope voltage with a voltage $V_{sense}$ sampled by the auxiliary winding, which can accurately sample the voltage signal $V_{sense}$ on the auxiliary winding. By continuously comparing the size relationship between $\Delta t_{r\_half}$ and $T_s/2$ in each switching cycle, the feedback amount calculation module accurately and carefully adjusts the digital value of the initial voltage $V_{initial}$ of the single slope digital wave. This can ensure that the initial position of the voltage signal $V_{ref\_slope}$ of the single slope digital wave can always change along with the change of the voltage signal $V_{sense}$ on the auxiliary winding under different load conditions, so as to accurately output the sampled midpoint sampling voltage signal $V_{sense}(t_{mid})$, thereby obtaining a better midpoint following effect under steady-state and dynamic conditions. In addition, by the current detection module, a pure digital schema is implemented rather than the conventional schema that widely uses analog to digital converters, the values of the primary-side average current $I_{mid\_p}$ and the secondary-side average current $I_s(t_{mid})$ in the CCM are indirectly sampled and calculated through the DAC sampling mechanism. The output secondary-side average current $I_s(t_{mid})$ is input to the deadtime calculation module, and the current reasonable deadtime $t_d$ is obtained by the calculation of the deadtime calculation module. The digital control module calculates a control amount $V_c(n)$ using the proportion and integration according to an error $e(n)$ between the midpoint voltage signal $V_{sense}(t_{mid})$ sampled by the single-output DAC and a system-predetermined value $V_{REF}$. A steady-state error is eliminated by negative feedback adjustment to make an output voltage $V_o$ stable. The operation of the PWM driving module is adjusted according to the deadtime $t_d$ and the control amount $V_c(n)$ output by the digital control module. The PWM driving module can be the same as the PWM driving module used in the prior art, including a reset-set (RS) flip-flop, a comparator, a digital to analog converter DAC, and a driving circuit therein. The slight difference here is that the present disclosure uses the output $t_d$ of the deadtime calculation module to control a duty cycle control signal duty_SR for the secondary-side synchronous rectifier, which is generated by the PWM driving module, so that when the duty cycle control signal duty_SR is at a falling edge, a width of a low level changes along with the deadtime $t_d$. In overall, the PWM driving module controls the switching of the primary-side switching transistor and the secondary-side synchronous rectifier through the signal duty and the signal duty_SR, so as to achieve the conversion from digital signals to time signals, thereby forming a closed loop system for the digitally controlled switching power supply.

The present disclosure has the advantages and benefits that: according to the present disclosure, the primary-side current is sampled to calculate the secondary-side average current through a digital to analog converter (DAC) sampling mechanism, and a primary-side average current $I_{mid\_p}$ and a secondary-side average current $I_s(t_{mid})$ in the CCM are obtained. Then, the secondary-side current is input into a deadtime calculation module, so that a reasonable deadtime $t_d$ is obtained. Finally, a PWM driving module is controlled by a primary-side feedback loop and the obtained deadtime $t_d$ together to generate a drive signal duty for the primary-side switching transistor and a drive signal duty_SR for the secondary-side rectifier, so that the deadtime between the turn-off of the secondary-side rectifier and the turn-on of the primary-side switching transistor in the CCM can be reasonably optimized.

Figure 9:
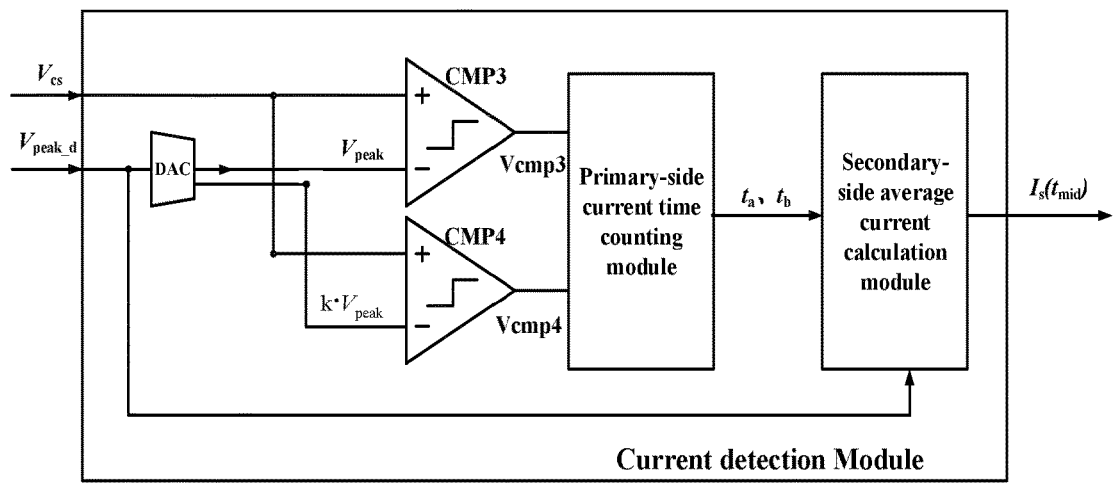
FIG. 9 shows an internal structure diagram of a current detection module in FIG. 8.

FIG. 9 shows an internal structure diagram of the current detection module. The pure digital schema is implemented rather than the conventional schema that widely uses analog to digital converters, the primary-side current is sampled to calculate the secondary-side average current through the DAC sampling mechanism, and the primary-side average current $I_{mid\_p}$ and the secondary-side average current $I_s(t_{mid})$ in the CCM are obtained. The secondary-side average current $I_s(t_{mid})$ as an output signal is input into the deadtime calculation module to calculate the reasonable deadtime $t_d$. The current detection module includes a single-input double-output DAC, two comparators CMP3 and CMP4, a primary-side current time counting module, and a secondary-side average current calculation module. The input of the DAC is given by a digital value $V_{peak\_d}$ of the voltage on a primary-side current sampling resistor, which corresponds to a primary-side peak current that an output signal of the control module is. The output of the DAC is analog values $V_{peak}$ and $V_{peak\_half}$ corresponding to $V_{peak\_d}$, in which $V_{peak\_half}$ is $k \cdot I_{peak\_p}$, $0 < k < 1$. A positive terminal of the comparator CMP3 is connected to a voltage $V_{cs}$ at the two terminals of the primary-side current sampling resistor $R_{cs}$, and a negative terminal thereof is connected to the voltage analog value $V_{peak}$ on the primary-side current sampling resistor corresponding to the primary-side peak current. An output signal $V_{cmp3}$ is input to the primary-side current time counting module as an input signal. A positive terminal of the comparator CMP4 is connected to the voltage $V_{cs}$ at the two terminals of the primary-side current sampling resistor $R_{cs}$, and a negative terminal thereof is connected to the voltage analog value $V_{peak\_half}$ on the primary-side current sampling resistor corresponding to k ($0 < k < 1$) times the primary-side peak current. To facilitate the calculation, the k here is given as 0.5. Therefore, $V_{peak\_half} = k \cdot V_{peak} = 0.5 \cdot V_{peak}$. An output signal $V_{cmp4}$ is input into the primary-side current time counting module as an input signal. The primary-side current time counting module consists of two counters. The input signals are the output signals $V_{cmp3}$ and $V_{cmp4}$ of the two comparators, respectively. According to changes between the high levels and low levels of $V_{cmp3}$ and $V_{cmp4}$, the time $t_a$ in which the primary-side current linearly increases from zero amp or an initial current to the peak current in the DCM, and the time $t_b$ in which the primary-side current linearly increases from zero amp or an initial current to the peak current in the CCM are obtained, so that the required times $t_a$ and $t_b$ are calculated respectively, and are input into the secondary-side average current calculation module as output signals. The input signals of the secondary-side average current calculation module are $t_a$ and $t_b$, and the primary-side peak current corresponds to the digital value $V_{peak\_d}$ of the voltage on the primary-side current sampling resistor. By means of the division of $V_{peak\_d}$ by a resistance of the primary-side current sampling resistor $R_{cs}$, a digital value corresponding to the peak current $I_{peak\_p}$ of the primary-side winding inductor can be derived. This digital value can be substituted into an expression of $I_s(t_{mid})$ to obtain the secondary-side average current $I_s(t_{mid})$ in the CCM, thereby obtaining a reasonable deadtime $t_d$, and achieving a reasonable optimization of the deadtime for the next operating cycle.

Figure 10:
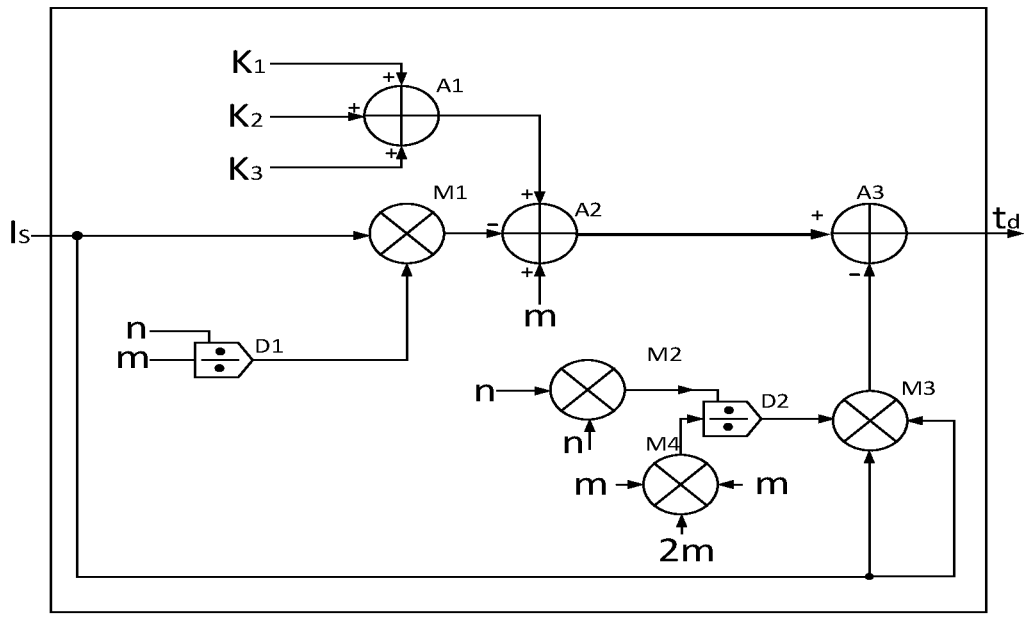
FIG. 10 shows an internal structure diagram of a deadtime calculation module in FIG. 8.

FIG. 10 shows an internal structure diagram of the deadtime calculation module. In view of the above analysis, the deadtime consists of the turn-off delay phase and the Miller effect phase of the MOSFET. To calculate the value of the deadtime, it is required to derive a relational expression which the times of the turn-off delay phase and the Miller effect phase should respectively satisfy. The derivation is given respectively below.

Turn-off delay phase: the circuit in this phase is as shown in FIG. 5. According to the above-stated analysis, $I_s$ substantially flows through the channel of the SR transistor in this phase. Therefore, $U_{ds} \approx I_s R_{ds}$, $U_{dg} \approx I_s R_{ds} - U_{gs}$. Moreover, $C_{gs}$ and $C_{dg}$ are discharged through the resistor $R_g$, and $U_{gs}$ drops from $U_g$ to $U_p$. Therefore, by analyzing the gate of the SR transistor, the following can be obtained:

$$R_{g1}(C_{gs} + C_{dg})\frac{dU_{gs}(t)}{dt} + U_{gs}(t) = 0. \tag{1}$$

By substituting $C_{iss}=C_{gs}+C_{dg}$ into the above formula, a duration $\Delta T_1$ of the turn-off delay phase can be calculated as follows:

$$\Delta T_1 = R_g C_{iss} \ln\left(\frac{U_g}{U_P}\right). \tag{2}$$

Since $$U_{gs} \geq U_P, C_{iss} \approx C_{ISS} = \frac{Q_g - Q_{gd} - Q_{gs}}{U_{GS} - U_P}.$$

Therefore, the above formula can be written as:

$$\Delta T_1 = R_g \frac{Q_g - Q_{gd} - Q_{gs}}{U_{GS} - U_P} \ln\left(\frac{U_g}{U_P}\right). \tag{3}$$

Miller effect phase: the circuit in this phase is as shown in FIG. 6. According to the above-stated analysis, in this phase $U_{gs}$ and $i_g$ substantially remain constant, that is, $$U_{gs}(t) \approx U_P, i_g(t) \approx \frac{U_P}{R_g},$$

and $i_g$ merely flows through $C_{dg}$ and causes $U_{dg}$ to increase from $I_s R_{ds} - U_p$ to $U_X - U_p$. In this process, the charge $Q_p$ dissipated in the gate of the SR transistor can be calculated as follows:

$$Q_P = \int_{I_s R_{ds} - U_P}^{U_X - U_P} C_{dg}(U_{dg}) dU_{dg}. \tag{4}$$

According to the above-stated analysis, $U_p \approx I_s R_{ds} + U_T$ and $C_{dg}=C_{dg}=C_{rss1}$. Therefore, the above-mentioned formula can be derived into:

$$Q_P = \int_{-U_T}^{U_X - I_s R_{ds} - U_T} C_{rss1}(U_{dg}) dU_{dg} = \int_{-U_T}^{U_{DS} - I_L R_{ds} - U_T} C_{rss1}(U_{dg}) dU_{dg} - \tag{5}$$

$$\int_{U_X - I_s R_{ds} - U_T}^{U_{DS} - I_L R_{ds} - U_T} C_{rss1}(U_{dg}) dU_{dg} = Q_{P1} - Q_{P2}.$$

Taking account into $$Q_{gd} = \int_{-U_T}^{U_{DS} - I_L R_{ds} - U_T} C_{rss1}(U_{dg}) dU_{dg},$$

so $Q_{P1}=Q_{gd}$.

According to data sheets of MOSFETs, it can be known that $$C_{rss} = \frac{C_{rss}(t)\sqrt{U_{dg}(t)}}{\sqrt{U_{dg}}}, \tag{6}$$

wherein $C_{rss}(t)$ is the real-time data of $C_{rss}$ when $U_{dg}=U_{dg}(t)$. $C_{rss}(t)$ and $U_{dg}(t)$ are the routine parameters in the data sheets of MOSFETs, and $U_{dg}(t)$ is normally given as 25V.

When substituting $Q_{P1}=Q_{gd}$ and the formula (6) into formula (5), it can be derived that:

$$Q_P = Q_{gd} - 2\sqrt{U_{dg}(t)}C_{rss}(t)(\sqrt{U_{DS} - I_L R_{ds} - U_T} - \sqrt{U_X - I_s R_{ds} - U_T}) \tag{7}$$

According to the formula (7) and $$i_g(t) \approx \frac{U_P}{R_g},$$

a duration $\Delta T_2$ in this phase (that is, the Miller effect phase) can be calculated as follows:

$$\Delta T_2 = \frac{R_g Q_P}{U_P} = \tag{8}$$

$$\frac{R_g}{U_P}\left[Q_{gd} - 2\sqrt{U_{dg}(t)}\,C_{rss}(t)\left(\sqrt{U_{DS} - I_L R_{ds} - U_T} - \sqrt{U_X - I_s R_{ds} - U_T}\right)\right].$$

In summary, the most optimized deadtime $t_d$ between the turn-off of the secondary-side rectifier SR and the turn-on of the primary-side switching transistor SW is:

$$t_d = \Delta T_1 + \Delta T_2 = R_g \frac{Q_g - Q_{gd} - Q_{gs}}{U_{GS} - U_P} \ln\left(\frac{U_g}{U_P}\right) + \tag{9}$$

$$\frac{R_g}{U_P}\left[Q_{gd} - 2\sqrt{U_{dg}(t)}\,C_{rss}(t)\left(\sqrt{U_{DS} - I_L R_{ds} - U_T} - \sqrt{U_X - I_s R_{ds} - U_T}\right)\right].$$

According to the above-stated analysis, for a given circuit, the variables in the above formulas, except $I_s$, are all constants. Therefore, the following constants can be defined:

$$K_1 = R_g \frac{Q_g - Q_{gd} - Q_{gs}}{U_{GS} - U_P} \ln\left(\frac{U_g}{U_P}\right),$$

$$K_2 = \frac{R_g}{U_P} Q_{gd},$$

$$K_3 = -\frac{2R_g}{U_P}\sqrt{U_{dg}(t)}\,C_{rss}(t)\sqrt{U_{DS} - I_L R_{ds} - U_T}.$$

For the fourth term in the formula (9), Taylor series is used herein to expand the fourth term, and higher-order terms are negligible:

$$f(I_s) = m - \frac{n}{m}I_s - \frac{n^2}{2m^3}I_s^2,$$

wherein $m=\sqrt{U_X-U_T}$, and $n=R_{ds}$. Therefore, the deadtime $t_d$ can be represented by:

$$t_d=K_1+K_2+K_3+f(I_s) \qquad (10).$$

For the internal block diagram of the deadtime calculation module in FIG. 10, according to the analysis, the variables are constants except that the secondary-side current $I_s$ is the variable. For the four components of the deadtime, $K_1$, $K_2$, and $K_3$ are constants, and the last term $f(I_s)$ is a power function of the secondary-side current $I_s$. Therefore, the input constants $K_1$, $K_2$, and $K_3$ are input to an adder $A_1$. A divider $D_1$ and a multiplier $M_1$ are used to arrive at a coefficient of $I_s$. A divider $D_2$ and multipliers $M_2$, $M_3$, and $M_4$ are used to arrive at a coefficient of $I_s^2$. Finally, adders $A_2$ and $A_3$ are used to arrive at the deadtime $t_d$.

Figure 11:
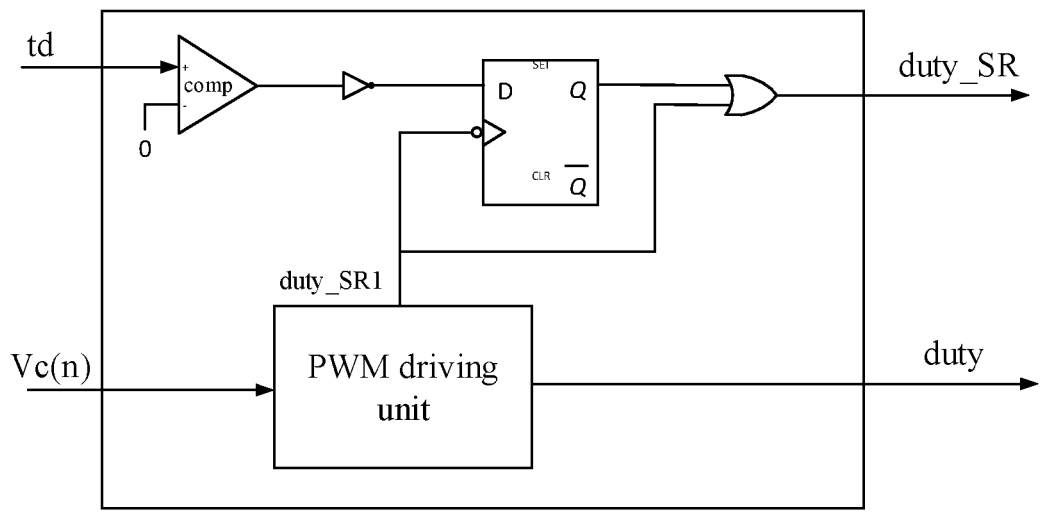
FIG. 11 shows an internal structure diagram of a PWM driving module in FIG. 8.

FIG. 11 shows the PWM driving module. The PWM driving module includes a conventional PWM driving module, which can be the same as the PWM driving unit used in the prior art, including a RS flip-flop, a comparator, a digital to analog converter DAC, and a driving circuit therein. The PWM driving module generates the duty cycle control signal duty for the primary-side switching transistor and the duty cycle control signal duty_SR for the secondary-side synchronous rectifier, resets the RS flip-flop to generate PWM waveforms having different duty cycles, and controls the switching of the primary-side switching transistor and the secondary-side synchronous rectifier. This achieves the conversion from digital signals to time signals, thereby forming the closed loop system for the digitally controlled switching power supply. The control signal duty for the primary-side switching transistor generated by the internal conventional PWM driving unit is used as an output signal to directly control the primary-side switching transistor, and the generated control signal duty_SRI for the secondary-side rectifier can be used to optimize the deadtime only after going through a simple logic circuit. The output $t_d$ from the deadtime calculation module passes through a zero-crossing comparator to generate a positive pulse. The positive pulse passes through an inverter to obtain a negative pulse. When a D flip-flop is triggered by a falling edge of the signal duty_SR, an AND logical operation is performed on the negative pulse and duty_SR, so that the deadtime at this time changes along with the width of the negative pulse, thereby achieving the optimization of the deadtime.

Figure 12:
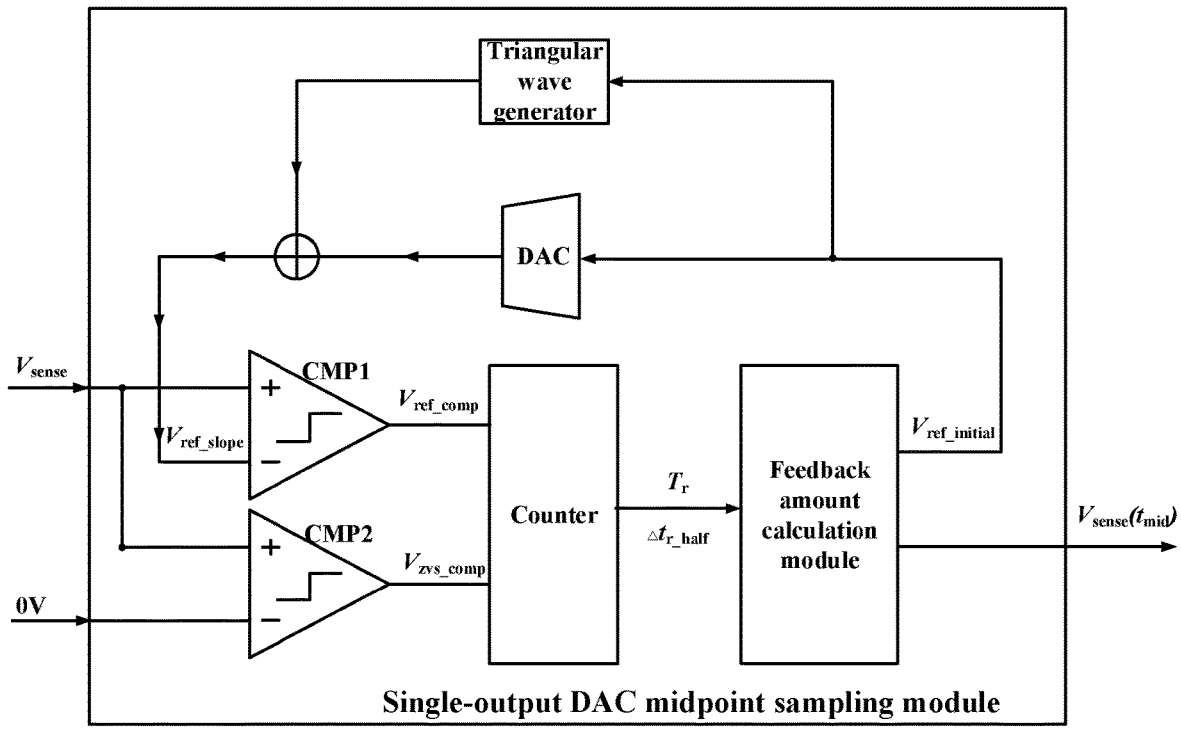
FIG. 12 shows an internal structure diagram of a single-output DAC midpoint sampling module in FIG. 8.

FIG. 12 shows an internal structure diagram of the single-output DAC midpoint sampling module. The single-output DAC midpoint sampling module includes a digital to analog converter DAC, a triangular wave generator, a comparator CMP1, a comparator CMP2, a counter, and a feedback amount calculation module. The function of the single-output DAC midpoint sampling module is to sample a voltage signal $V_{sense}(t_{mid})$ on the auxiliary winding at the midpoint $t_{mid}$ of the secondary-side current reset time. The flowing direction of the signal is that: the voltage signal $V_{sense}$ on the auxiliary winding flows in as an input signal, and is input to the positive terminals of the two comparators, and is respectively compared with the voltage signal $V_{ref\_slope}$ of the single slope digital wave and with the zero voltage to obtain a feedback comparison signal $V_{ref\_comp}$ and a zero-crossing comparison signal $V_{zvs\_comp}$, respectively. The counter counts to obtain values of $\Delta t_{r\_half}$ and $T_r$ according to changes between high levels and low levels of the feedback comparison signal $V_{ref\_comp}$ and the zero-crossing comparison signal $V_{zvs\_comp}$. $\Delta t_{r\_half}$ is a total time required for the single slope digital wave $V_{ref\_slope}$ to rise from the position of the initial voltage $V_{initial}$ to the position crossing the voltage signal $V_{sense}$ on the auxiliary winding. $T_r$ is a reset time required for the secondary-side current to drop from the peak value to the lowest point. Finally, the feedback amount calculation module adjusts the digital value of the initial voltage $V_{initial}$ of the single slope digital wave for the next cycle according to the difference between the values of $\Delta t_{r\_half}$ and $T_r$. When the voltage signal $V_{sense}$ on the auxiliary winding is equal to the voltage signal $V_{ref\_slope}$ of the single slope digital wave, the instant value of the voltage signal $V_{ref\_slope}$ of the single slope digital wave is assigned to the midpoint voltage signal $V_{sense}(t_{mid})$ to output as the output signal of the single-output DAC midpoint sampling module in the current switching cycle. It should be noted that the midpoint voltage signal $V_{sense}(t_{mid})$ can be output for each cycle. Although during a dynamic phase when the load changes and the voltage signal $V_{sense}$ on the auxiliary winding changes, the midpoint voltage signal $V_{sense}(t_{mid})$ output from the single-output DAC midpoint sampling module is in the strict sense not the voltage signal $V_{sense}(t_{mid})$ on the auxiliary winding at an instant $T_r/2$, instead is only an approximate amount which gradually approaches. Through the continuous comparison of the values of $\Delta t_{r\_half}$ and $T_r/2$ in each cycle, the midpoint voltage signal $V_{sense}(t_{mid})$ output by the single-output DAC midpoint sampling module can have a value that in the strict sense precisely equal to the value of the voltage signal $V_{sense}(t_{mid})$ on the auxiliary winding at the instant $T_r/2$ by gradually approaching in a plurality of switching cycles. Since the adjustment rate of the single-output DAC midpoint sampling module is high, and the proportion of the dynamically adjusted cycles is very small in comparison with the steady-state cycles, the assigned output signals of the single-output DAC midpoint sampling module are referred to as the midpoint voltage signal $V_{sense}(t_{mid})$ when the voltage signal $V_{sense}$ on the auxiliary winding for each switching cycle is equal to the voltage signal $V_{ref\_slope}$ of the single slope digital wave.

Figure 13:
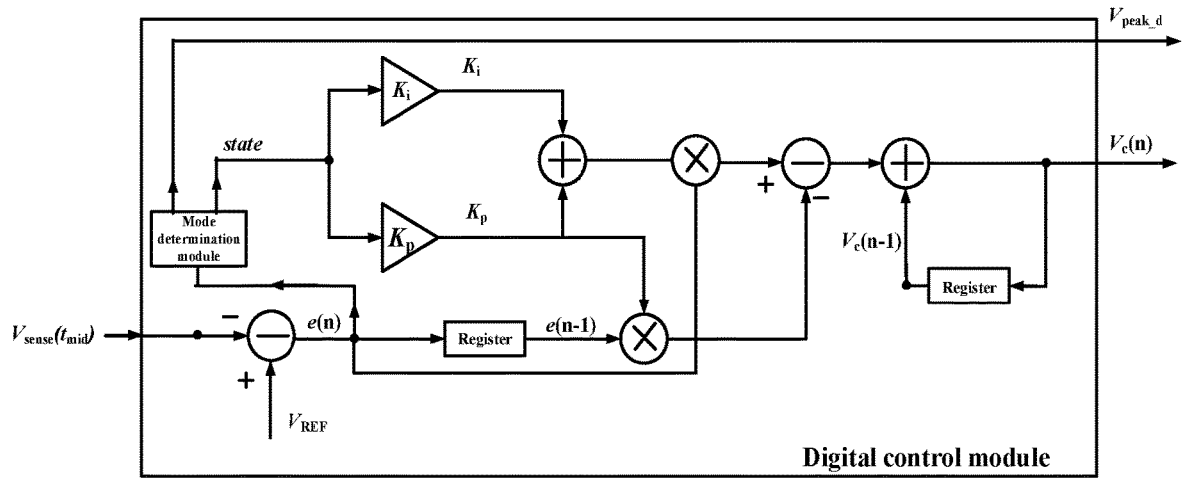
FIG. 13 shows an internal structure diagram of a digital control module in FIG. 8.

FIG. 13 shows an internal structure diagram of the digital control module. The digital control module can be the same as the digital control module in the prior art. In an embodiment, it is a digital PI control module, the core of which is a PI control, that is, a proportional-integral control. The digital control module includes an adder, a subtractor, a multiplier, a register, operational amplifiers $K_p$ and $K_i$, and a mode determination module. The specific connection relationship is that: the midpoint sampling voltage signal $V_{sense}(t_{mid})$ of the DAC and the system-predetermined fixed value $V_{REF}$ pass through the subtractor to obtain an error e(n). On the one hand, e(n) serves as an input to the register, and on the other hand, controls the mode determination module. The mode determination module outputs two signals $V_{peak\_a}$ and a state state. The state signal state is divided into two signals passing through the operational amplifiers, and then are summed through the adder. An output e(n−1) of the register is multiplied by one of the signals from the state state, and the result is transferred to the subsequent subtractor. The summed state signal is multiplied by the error e(n), and passes sequentially through the subtractor and adder to finally obtain a control signal $V_c(n)$. The control signal $V_c(n)$ here is fed back to the adder of the previous level through a register. The input signal is the midpoint sampling voltage signal $V_{sense}(t_{mid})$ of the single-output DAC, and the output signals are the digital value $V_{peak\_d}$ of the peak voltage on the primary-side current sampling resistor $R_{cs}$ and the control signal $V_c(n)$. The output of the proportional control is proportional to the input error signal. The output of the integral control is proportional to the integration of the input error signal. When the system has only the proportional control, a steady-state error exists in the output. To eliminate the steady-state error, it is required to introduce the integral control. The PI controller can bring the system into a steady state without any steady-state error. According to the error between the midpoint sampling voltage signal $V_{sense}(t_{mid})$ of the single-output DAC as the input signal and the system-predetermined fixed value $V_{REF}$, the control amount $V_c(n)$ is calculated by the proportion and integration, thereby eliminating the steady-state error. In addition, the mode determination module can also directly give a digital value $V_{peak}$ of the peak voltage on the primary-side current sampling resistor $R_{cs}$ as the output signal according to the value of the error $e(n)$. The expressions are given as following formulas (11) and (12):

$$V_c(n)=V_c(n-1)+K_p\cdot(e(n)-e(n-1))+K_i\cdot e(n) \quad (11),$$

$$e(n)=V_{sense}(t_{mid})-V_{REF} \quad (12).$$

$V_c(n)$ denotes a control amount in a current cycle. $V_c(n-1)$ denotes a control amount in a previous cycle. $e(n)$ denotes an error in the current cycle. $e(n-1)$ denotes an error in the previous circle. $K_p$ and $K_i$ denote an integral parameter and a differential parameter, respectively, which are not a unique value in the full load range, and need to be set to different values according to different modes.

The present disclosure further provides a control system of a flyback power supply having a primary-side feedback in the CCM. The flyback power supply having the primary-side feedback includes a primary side of a transformer, a secondary side of the transformer, and an auxiliary winding. The primary side includes a primary-side winding, a primary-side switching transistor, and a primary-side current sampling resistor that is in series connected to the primary-side switching transistor. The secondary side includes a secondary-side winding and a secondary-side rectifier. The control system includes: a single-output DAC midpoint sampling module sampling a voltage signal $V_{sense}(t_{mid})$ on the auxiliary winding at a midpoint instant $T_r/2$ of a secondary-side current reset time $T_r$; a digital control module calculating an error $e(n)$ between the voltage signal $V_{sense}(t_{mid})$ and a predetermined fixed value $V_{REF}$, calculating an input voltage control amount $V_c(n)$ for a PWM driving module by using proportion and integration according to the error $e(n)$, and obtaining a digital value $V_{peak\_d}$ of a peak voltage on the primary-side current sampling resistor $R_{cs}$ according to the error $e(n)$; a current detection module indirectly sampling and calculating through a digital-to-analog conversion according to the digital value $V_{peak\_d}$ and a voltage $V_{cs}$ at two terminals of the primary-side current sampling resistor $R_{cs}$ to obtain a primary-side average current $I_{mid\_p}$ and a secondary-side average current $I_s(t_{mid})$ in the CCM; a deadtime calculation module calculating a deadtime $t_d$ between a turn-off of the secondary-side rectifier and a turn-on of the primary-side switching transistor according to the secondary-side average current $I_s(t_{mid})$; and the PWM driving module generating a primary-side duty cycle control signal duty and a secondary-side duty cycle control signal duty_SR according to the deadtime $t_d$ and the input voltage control amount $V_c(n)$, and controlling switching of the primary-side switching transistor according to the primary-side duty cycle control signal duty, and controlling switching of the secondary-side rectifier according to the secondary-side duty cycle control signal duty_SR.

In one of the embodiments, the single-output DAC midpoint sampling module includes a digital to analog converter, a triangular wave generator, a comparator CMP1, a comparator CMP2, a counter, and a feedback amount calculation module. The voltage signal $V_{sense}$ on the auxiliary winding is input as input signals to a positive terminal of the comparator CMP1 and a positive terminal of the comparator CMP2, respectively. After a digital single sloping wave output by the triangular wave generator is superimposed on an analog reference voltage output by the digital to analog converter, a voltage signal $V_{ref\_slope}$ of the single slope digital wave is obtained and is input to a negative terminal of the comparator CMP1. A negative terminal of the comparator CMP2 is connected to zero voltage. The comparator CMP1 outputs a feedback comparison signal $V_{ref\_comp}$ to the counter, and the comparator CMP2 outputs a zero-crossing comparison signal $V_{zvs\_comp}$ to the counter. The counter counts to obtain values of $\Delta t_{r\_half}$ and $T_r$ according to changes between high levels and low levels of the feedback comparison signal $V_{ref\_comp}$ and the zero-crossing comparison signal $V_{zvs\_comp}$, in which $\Delta t_{r\_half}$ is a total time required for the voltage signal $V_{ref\_slope}$ of the single slope digital wave to rise from a position of an initial voltage $V_{initial}$ to a position crossing the voltage signal $V_{sense}$ on the auxiliary winding, and $T_r$ is a reset time required for the secondary-side current to drop from a peak value to the lowest point. According to a difference between the values of $\Delta t_{r\_half}$ and $T_r$, the feedback amount calculation module outputs a feedback signal $V_{ref\_initial}$ to an input terminal of the triangular wave generator and an input terminal of the digital to analog converter and adjusts a digital value of the initial voltage $V_{initial}$ for a next cycle. When the voltage signal $V_{sense}$ on the auxiliary winding is equal to the voltage signal $V_{ref\_slope}$ of the single slope digital wave, the instant value of the voltage signal $V_{ref\_slope}$ of the single slope digital wave is assigned to the voltage signal $V_{sense}(t_{mid})$ to output as an output signal of the single-output DAC midpoint sampling module in a current switching cycle.

In one of the embodiments, the current detection module includes a single-input double-output digital to analog converter, a comparator CMP3, a comparator CMP4, a primary-side current time counting module, and a secondary-side average current calculation module. The single-input double-output digital to analog converter and the secondary-side average current calculation module receive the digital value $V_{peak\_d}$ output by the digital control module. A positive terminal of the comparator CMP3 and a positive terminal of the comparator CMP4 receive the voltage $V_{cs}$. A primary-side peak current output by a first output terminal of the single-input double-output digital to analog converter corresponds to the voltage analog value $V_{peak}$ on the primary-side current sampling resistor, and the voltage analog value $V_{peak}$ is output to a negative terminal of the comparator CMP3. A second output terminal of the single-input double-output digital to analog converter outputs $V_{peak\_half}$, wherein $V_{peak\_half}=k\cdot V_{peak}$, $0<k<1$, and the $V_{peak\_half}$ is output to a negative terminal of the comparator CMP4. The comparator CMP3 outputs a comparison signal $V_{cmp3}$ to a first counter of the primary-side current time counting module. The comparator CMP4 outputs a comparison signal $V_{cmp4}$ to a second counter of the primary-side current time counting module. According to changes of high levels and low levels of the comparison signal $V_{cmp3}$ and the comparison signal $V_{cmp4}$, the primary-side current time counting module obtains a time $t_a$ required by a linear increase of a primary current from zero amp or an initial current to a peak current in a DCM and a time $t_b$ required by a linear increase of the primary-side current from zero amp or the initial current to the peak current in the CCM, and outputs the times $t_a$ and $t_b$ to the secondary-side average current calculation module. The secondary-side average current calculation module divides the digital value $V_{peak\_d}$ by a resistance of the primary-side current sampling resistor $R_{cs}$ to obtain a digital value $I_{peak\_p}$ corresponding to a peak current of the primary-side winding inductor, which is substituted into an expression of $I_s(t_{mid})$ along with the times $t_a$ and $t_b$:

$$I_s(t_{mid}) = \frac{N_p}{N_s} \cdot \frac{(1+k)t_b - (1-k)t_a}{2t_b} \cdot I_{peak\_p},$$

wherein $N_p$ and $N_s$ denote a number of turns of the primary-side winding and the secondary-side winding of the transformer respectively, to obtain and output the secondary-side average current $I_s(t_{mid})$ in the CCM.

In one of the embodiments, the deadtime calculation module calculates the deadtime $t_d$ according to the following formulas:

$$t_d = K_1 + K_2 + K_3 + f(I_s),$$

$$K_1 = R_g \frac{Q_g - Q_{gd} - Q_{gs}}{U_{GS} - U_P} \ln\left(\frac{U_g}{U_P}\right),$$

$$K_2 = \frac{R_g}{U_P} Q_{gd},$$

$$K_3 = -\frac{2R_g}{U_P} \sqrt{U_{dg}(t)} C_{rss}(t) \sqrt{U_{DS} - I_L R_{ds} - U_T},$$

$$f(I_s) = m - \frac{n}{m} I_s - \frac{n^2}{2m^3} I_s^2,$$

$$m = \sqrt{U_X - U_T}, n = R_{ds}.$$

In the above-mentioned formulas, $U_p$ is a Miller plateau voltage. $U_g$ is a gate voltage of the secondary-side rectifier. $R_g$ is a gate resistance of the secondary-side rectifier. $Q_g$ is a total dissipation charge amount of the gate during the turn-off of the secondary-side rectifier. $Q_{gd}$ is a dissipation charge amount of the gate in a Miller effect phase during the turn-off of the secondary-side rectifier. $Q_{gs}$ is a dissipation charge amount of the gate in a phase that $U_{gs}$ decreases from the Miller plateau voltage $U_p$ to 0 during the turn-off of the secondary-side rectifier. $I_L$ is a load current. $U_{ds}$ is an input voltage of the secondary-side rectifier. $C_{rss}$ is a reverse transfer capacitance of the secondary-side rectifier. $I_s$ is a secondary-side current. $U_X$ is an experimental measurement. $U_T$ is a threshold voltage of the secondary-side rectifier, and $R_{ds}$ is a source-drain resistance of the secondary-side rectifier.

In one of the embodiments, the PWM driving module includes a comparator, an inverter, a D flip-flop, an OR-gate, and a PWM driving unit. A positive input terminal of the comparator inputs the deadtime $t_d$. A negative input terminal of the comparator is connected to zero voltage. An output terminal of the comparator is connected to an input terminal of the inverter. An output terminal of the inverter is connected to a D-input terminal of the D flip-flop. An input signal of the PWM driving unit is the input voltage control amount $V_c(n)$. A first output terminal of the PWM driving unit outputs the primary-side duty cycle control signal duty, and a second output terminal thereof outputs the signal duty_SRI to a clock control terminal of the D flip-flop. A Q-output terminal of the D flip-flop is connected to one input terminal of the OR-gate, the signal duty_SRI is input to the other input terminal of the OR-gate. An output terminal of the OR-gate outputs the secondary-side duty cycle control signal duty_SR.

In one of the embodiments, the secondary-side rectifier is a MOS transistor.

In one of the embodiments, the primary-side switching transistor is a MOS transistor. The primary-side current sampling resistor is connected in series between the source of the primary-side switching transistor and the ground.

The present disclosure further provides a method of controlling a flyback power supply having a primary-side feedback in the CCM. The flyback power supply having the primary-side feedback includes a primary side of a transformer, a secondary side of the transformer, and an auxiliary winding. The primary side includes a primary-side winding, a primary-side switching transistor, and a primary-side current sampling resistor that is connected in series to the primary-side switching transistor. The secondary side includes a secondary-side winding and a secondary-side rectifier. The method includes: sampling a voltage signal $V_{sense}(t_{mid})$ on the auxiliary winding at a midpoint instant $T_r/2$ of a secondary-side current reset time $T_r$; calculating an error $e(n)$ between the voltage signal $V_{sense}(t_{mid})$ and a predetermined fixed value $V_{REF}$, calculating an input voltage control amount $V_c(n)$ for a PWM driving module by using proportion and integration according to the error $e(n)$, and obtaining a digital value $V_{peak\_d}$ of a peak voltage on the primary-side current sampling resistor $R_{cs}$ according to the error $e(n)$; indirectly sampling and calculating to obtain a primary-side average current $I_{mid\_p}$ and a secondary-side average current $I_s(t_{mid})$ in the CCM through a digital-to-analog conversion according to the digital value $V_{peak\_d}$ and a voltage $V_{cs}$ at two terminals of the primary-side current sampling resistor $R_{cs}$; calculating a deadtime $t_d$ between a turn-off of the secondary-side rectifier and a turn-on of the primary-side switching transistor according to the secondary-side average current $I_s(t_{mid})$; generating, by the PWM driving module, a primary-side duty cycle control signal duty and a secondary-side duty cycle control signal duty_SR according to the deadtime $t_d$ and the input voltage control amount $V_c(n)$; and controlling switching of the primary-side switching transistor according to the primary-side duty cycle control signal duty, and controlling switching of the secondary-side rectifier according to the secondary-side duty cycle control signal duty_SR.

In one of the embodiments, the step of sampling the voltage signal $V_{sense}(t_{mid})$ on the auxiliary winding at the midpoint instant $T_r/2$ of the secondary-side current reset time $T_r$, includes:

inputting, by a positive terminal of a comparator CMP1, a voltage signal $V_{sense}$ on the auxiliary winding, after superimposition of a digital single sloping wave output by a triangular wave generator and an analog reference voltage output by a digital to analog converter, obtaining a voltage signal $V_{ref\_slope}$ of a single slope digital wave to output to a negative terminal of the comparator CMP1, and outputting, by the comparator CMP1, a feedback comparison signal $V_{ref\_comp}$;

inputting, by a positive terminal of a comparator CMP2, the voltage signal $V_{sense}$ on the auxiliary winding, inputting, by a negative terminal thereof, zero voltage, and outputting, by the comparator CMP2, a zero-crossing comparison signal $V_{zvs\_comp}$;

counting to obtain values of $\Delta t_{r\_half}$ and $T_r$ according to changes between high levels and low levels of the feedback comparison signal $V_{ref\_comp}$ and the zero-crossing comparison signal $V_{zvs\_comp}$, wherein $\Delta t_{r\_half}$ is a total time required for the voltage signal $V_{ref\_slope}$ of the single slope digital wave to rise from a position of an initial voltage $V_{initial}$ to a position crossing the voltage signal $V_{sense}$ on the auxiliary winding, and $T_r$ is a reset time required for a secondary-side current to drop from a peak value to a lowest point;

outputting a feedback signal $V_{ref\_initial}$ to an input terminal of the triangular wave generator and an input terminal of the digital to analog converter and adjusting a digital value of the initial voltage $V_{initial}$ for a next cycle according to a difference between the values of $\Delta t_{r\_half}$ and $T_r$; and assigning, when the voltage signal $V_{sense}$ on the auxiliary winding is equal to the voltage signal $V_{ref\_slope}$ of the single slope digital wave, an instant value of the voltage signal $V_{ref\_slope}$ of the single slope digital wave to the voltage signal $V_{sense}(t_{mid})$ In one of the embodiments, the step of indirectly sampling and calculating to obtain the primary-side average current $I_{mid\_p}$ and the secondary-side average current $I_s(t_{mid})$ in the CCM through the digital-to-analog conversion according to the digital value $V_{peak\_d}$ and the voltage $V_{cs}$ at the two terminals of the primary-side current sampling resistor $R_{cs}$, includes:

receiving, by a positive terminal of a comparator CMP3 and a positive terminal of a comparator CMP4, the voltage $V_{cs}$;

performing a digital-to-analog conversion on the digital value $V_{peak\_d}$ to obtain a voltage analog value $V_{peak}$ on the primary-side current sampling resistor corresponding to a primary-side peak current and output the voltage analog value $V_{peak}$ to a negative terminal of the comparator CMP3, and to obtain $V_{peak\_half}$ and output the $V_{peak\_half}$ to a negative terminal of the comparator CMP4, wherein $V_{peak\_half}=k \cdot V_{peak}$, $0<k<1$;

obtaining, according to changes between high levels and low levels of a comparison signal $V_{cmp3}$ output by the comparator CMP3 and changes between high levels and low levels of a comparison signal $V_{cmp4}$ output by the comparator CMP4, a time $t_a$ required by a linear increase of a primary-side current from zero amp or an initial current to a peak current in a DCM and a time $t_b$ required by a linear increase of the primary-side current from zero amp or the initial current to the peak current in the CCM;

dividing the digital value $V_{peak\_d}$ by a resistance of the primary-side current sampling resistor $R_{cs}$ to obtain a digital value $I_{peak\_p}$ of a peak current of a primary-side winding inductor; and substituting the digital value $I_{peak\_p}$, and the times $t_a$ and $t_b$ into an expression of $I_s(t_{mid})$:

$$I_s(t_{mid}) = \frac{N_p}{N_s} \cdot \frac{(1+k)t_b - (1-k)t_a}{2t_b} \cdot I_{peak\_p},$$

wherein $N_p$ and $N_s$ denote a number of turns of the primary-side winding and the secondary-side winding of the transformer respectively, to obtain the secondary-side average current $I_s(t_{mid})$ in the CCM.

In one of the embodiments, during the step of calculating the deadtime $t_d$ between the turn-off of the secondary-side rectifier and the turn-on of the primary-side switching transistor according to the secondary-side average current $I_s(t_{mid})$, the deadtime $t_d$ is calculated according to following formulas:

$$t_d = K_1 + K_2 + K_3 + f(I_s),$$

$$K_1 = R_g \frac{Q_g - Q_{gd} - Q_{gs}}{U_{GS} - U_P} \ln\left(\frac{U_g}{U_P}\right),$$

$$K_2 = \frac{R_g}{U_P} Q_{gd},$$

$$K_3 = -\frac{2R_g}{U_P} \sqrt{U_{dg}(t)} C_{rss}(t) \sqrt{U_{DS} - I_L R_{ds} - U_T},$$

$$f(I_s) = m - \frac{n}{m} I_s - \frac{n^2}{2m^3} I_s^2,$$

$$m = \sqrt{U_X - U_T}, n = R_{ds}.$$

In the above-mentioned formulas, $U_p$ is a Miller plateau voltage, $U_g$ is a gate voltage of the secondary-side rectifier, $R_g$ is a gate resistance of the secondary-side rectifier, $Q_g$ is a total dissipation charge amount of the gate during the turn-off of the secondary-side rectifier, $Q_{gd}$ is a dissipation charge amount of the gate in a Miller effect phase during the turn-off of the secondary-side rectifier, $Q_{gs}$ is a dissipation charge amount of the gate in a phase that $U_{gs}$ decreases from the Miller plateau voltage $U_p$ to 0 during the turn-off of the secondary-side rectifier, $I_L$ is a load current, $U_{ds}$ is an input voltage of the secondary-side rectifier, $C_{rss}$ is a reverse transfer capacitance of the secondary-side rectifier, $I_s$ is a secondary-side current, $U_X$ is an experimental measurement, $U_T$ is a threshold voltage of the secondary-side rectifier, and $R_{ds}$ is a source-drain resistance of the secondary-side rectifier.

What is claimed is:

1. A deadtime automatic-optimization system of a flyback power supply having a primary-side feedback in a continuous conduction mode (CCM), comprising:
  a control system consisting of a single-output digital to analog converter (DAC) midpoint sampling module, a digital control module, a current detection module, a deadtime calculation module, and a pulse-width modulation (PWM) driving module, the control system forming a closed loop with a main topology of a controlled flyback converter having a synchronous-rectification primary-side feedback;
  wherein the single-output DAC midpoint sampling module is configured to sample a voltage signal $V_{sense}(t_{mid})$ on an auxiliary winding at a midpoint instant of a secondary-side current reset time $T_r$, to output to the digital control module;
  the digital control module is configured to calculate an error $e(n)$ between the voltage signal $V_{sense}(t_{mid})$ and a system-predetermined fixed value $V_{REF}$ and calculate an input voltage control amount $V_c(n)$ for the PWM driving module by using proportion and integration to output to the PWM driving module;
  the digital control module is configured to output a digital value $V_{peak\_d}$ of a peak voltage on a primary-side current sampling resistor $R_{cs}$ according to a value of the error $e(n)$;
  the digital value $V_{peak\_d}$ and a voltage $V_{cs}$ at two terminals of the primary-side current sampling resistor $R_{cs}$ are configured to output to the current detection module;
  the current detection module is configured to obtain a primary-side average current $I_{mid\_p}$ and a secondary-side average current $I_s(t_{mid})$ in the CCM indirectly by sampling and calculating in a pure digital manner through a DAC, and output the secondary-side average current $I_x(t_{mid})$ as an output signal to the deadtime calculation module to calculate a reasonable deadtime $t_d$ between a turn-off of a secondary-side rectifier SR and a turn-on of a primary-side switching transistor SW;

the PWM driving module is configured to generate duty cycle control signals duty and duty_SR under a common control of the deadtime $t_d$ output by the deadtime calculation module and the control amount $V_c(n)$ output by the digital control module; and the duty cycle control signals duty and duty_SR are configured to control switching of the primary-side switching transistor SW and the secondary-side rectifier SR, respectively, to implement an automatic optimization of the deadtime of the flyback power supply having the synchronous-rectification primary-side feedback in the CCM.

2. The deadtime automatic-optimization system of claim 1, wherein the single-output DAC midpoint sampling module comprises:

a first DAC, a triangular wave generator, a first comparator CMP1, a second comparator CMP2, a counter, and a feedback amount calculation module;

wherein a voltage signal $V_{sense}$ on the auxiliary winding is connected as an input signal to positive terminals of the first comparator CMP1 and the second comparator CMP2, respectively;

a negative terminal of the first comparator CMP1 is connected to a voltage signal $V_{ref\_slope}$ of a single slope digital wave obtained by superimposition of a digital single sloping wave output by the triangular wave generator and an analog reference voltage output by the first DAC;

a negative terminal of the second comparator CMP2 is connected to zero voltage;

the first comparator CMP1 and the second comparator CMP2 respectively output a feedback comparison signal $V_{ref\_comp}$ and a zero-crossing comparison signal $V_{zvs\_comp}$ to be connected to the counter;

the counter is configured to count to obtain values of $\Delta t_{r\_half}$ and $T_r$ according to changes between high levels and low levels of the feedback comparison signal $V_{ref\_comp}$ and the zero-crossing comparison signal $V_{zvs\_comp}$; $\Delta t_{r\_half}$ is a total time required for the voltage signal $V_{ref\_slope}$ of the single slope digital wave to rise from a position of an initial voltage $V_{initial}$ to a position crossing the voltage signal $V_{sense}$ on the auxiliary winding, and $T_r$ is a reset time required for the secondary-side current to drop from a peak value to a lowest point;

the feedback amount calculation module is configured to output a feedback signal $V_{ref\_initial}$ to be connected to an input terminal of the triangular wave generator and an input terminal of the first DAC, and is configured to adjust a digital value of the initial voltage $V_{initial}$ of the single slope digital wave for a next cycle according to a difference between the values of $\Delta t_{r\_half}$ and $T_r$; and when the voltage signal $V_{sense}$ on the auxiliary winding is equal to the voltage signal $V_{ref\_slope}$ of the single slope digital wave, an instant value of the voltage signal $V_{ref\_slope}$ of the single slope digital wave is assigned to the voltage signal $V_{sense}(t_{mid})$ at the midpoint instant $T_{mid}$ to output as an output signal of the single-output DAC midpoint sampling module in a current switching cycle.

3. The deadtime automatic-optimization system of claim 1, wherein the digital control module comprises:

an adder, a subtractor, a multiplier, a register, operational amplifiers $K_p$ and $K_i$, and a mode determination module;

wherein an input signal of the digital control module is the voltage signal $V_{sense}(t_{mid})$ of the single-output DAC midpoint sampling module, and output signals of the digital control module are the digital value $V_{peak\_d}$ of the peak voltage on the primary-side current sampling resistor $R_{cs}$ and the control amount $V_c(n)$;

a value of the error $e(n)$ between the voltage signal $V_{sense}(t_{mid})$ of the single-output DAC midpoint sampling module and the system-predetermined fixed value $V_{REF}$ is calculated, and the control amount $V_c(n)$ is calculated by proportion and integration according to the error $e(n)$ to output; and the mode determination module is configured to output the digital value $V_{peak\_d}$ of the peak value on the primary-side current sampling resistor $R_{cs}$ as an output signal according to the value of the error $e(n)$.

4. The deadtime automatic-optimization system of claim 1, wherein the current detection module comprises:

a single-input double-output DAC, a third comparator CMP3 and a fourth comparator CMP4, a primary-side current time counting module, and a secondary-side average current calculation module;

wherein the digital value $V_{peak\_d}$ of the peak voltage on the primary-side current sampling resistor $R_{cs}$ output by the digital control module is respectively connected to the single-input double-output DAC and the secondary-side average current calculation module;

a positive terminal of the third comparator CMP3 is connected to the voltage $V_{cs}$ at the two terminals of the primary-side current sampling resistor $R_{cs}$, and a negative terminal of the third comparator CMP3 is connected to a voltage analog value $V_{peak}$ on the primary-side current sampling resistor corresponding to a primary-side peak current output by the single-input double-output DAC;

a positive terminal of the fourth comparator CMP4 is connected to the voltage $V_{cs}$ at the two terminals of the primary-side current sampling resistor $R_{cs}$, and a negative terminal of the fourth comparator CMP4 is connected to a voltage analog value $V_{peak\_half}$ on the primary-side current sampling resistor corresponding to k times of the voltage analog value $V_{peak}$ on the primary-side current sampling resistor corresponding to the primary-side peak current, and $V_{peak\_half} = k \cdot V_{peak}$, $0<k<1$;

the third comparator CMP3 and the fourth comparator CMP4 are configured to output comparison signals and $V_{cmp3}$ and $V_{cmp4}$, respectively, and the comparison signals $V_{cmp3}$ and $V_{cmp4}$ are connected to the primary-side current time counting module;

the primary-side current time counting module comprises two counters, input signals of the two counters are the comparison signals and $V_{cmp3}$ and $V_{cmp4}$ of the comparators CMP3 and CMP4, respectively;

according to changes between high levels and low levels of the comparison signals $V_{cmp3}$ and $V_{cmp4}$, a time $t_a$ required by a linear increase of a primary-side current from zero amp or an initial current to a peak current in a discontinuous conduction mode (DCM), and a time $t_b$ required by a linear increase of the primary-side current from zero amp or the initial current to the peak current in the CCM are obtained;

the times $t_a$ and $t_b$ are configured to output to the secondary-side average current calculation module;

according to the input times $t_a$ and $t_b$ and the digital value $V_{peak\_d}$ of the peak voltage on the primary-side current sampling resistor $R_{cs}$ output by the digital control module, the secondary-side average current calculation module is configured to divide $V_{peak\_d}$ by a resistance of the primary-side current sampling resistor $R_{cs}$ to obtain a digital value corresponding to a peak current $I_{peak\_p}$ of a primary-side winding inductor, and the digital value corresponding to the peak current $I_{peak\_p}$ is substituted into an expression of $I_s(t_{mid})$:

$$I_s(t_{mid}) = \frac{N_p}{N_s} \cdot \frac{(1+k)t_b - (1-k)t_a}{2t_b} \cdot I_{peak\_p},$$

wherein $N_p$ and $N_s$ denote a number of turns of a primary side and a secondary side of a transformer, respectively, and the secondary-side average current $I_s(t_{mid})$ in the CCM is obtained and output.

5. The deadtime automatic-optimization system of claim 1, wherein the deadtime calculation module is configured to calculate the reasonable deadtime $t_d$ between the turn-off of the secondary-side rectifier SR and the turn-on of the primary-side switching transistor SW according to the secondary-side average current $I_s(t_{mid})$ output by the current detection module by using a calculation chain comprising an adder, a multiplier, and a divider, and the deadtime $t_d$ is calculated according to following formulas:

$$t_d = K_1 + K_2 + K_3 + f(I_s),$$

$$K_1 = R_g \frac{Q_g - Q_{gd} - Q_{gs}}{U_{GS} - U_P} \ln\left(\frac{U_g}{U_P}\right),$$

$$K_2 = \frac{R_g}{U_P} Q_{gd},$$

$$K_3 = -\frac{2R_g}{U_P} \sqrt{U_{dg}(t)} C_{rss}(t) \sqrt{U_{DS} - I_L R_{ds} - U_T},$$

$$f(I_s) = m - \frac{n}{m} I_s - \frac{n^2}{2m^3} I_s^2,$$

$$m = \sqrt{U_X - U_T}, n = R_{ds},$$

in the formulas, $U_p$ is a Miller plateau voltage, $U_g$ is a gate voltage of the secondary-side rectifier, $R_g$ is a gate resistance of the secondary-side rectifier, $Q_g$ is a total dissipation charge amount of the gate during the turn-off of the secondary-side rectifier, $Q_{gd}$ is a dissipation charge amount of the gate in a Miller effect phase during the turn-off of the secondary-side rectifier, $Q_{gs}$ is a dissipation charge amount of the gate in a phase that $U_{gs}$ decreases from the Miller plateau voltage $U_p$ to 0 during the turn-off of the secondary-side rectifier, $I_L$ is a load current, $U_{ds}$ is an input voltage of the secondary-side rectifier, $C_{rss}$ is a reverse transfer capacitance of the secondary-side rectifier, $I_s$ is a secondary-side current, $U_X$ is an experimental measurement, $U_\tau$ is a threshold voltage of the secondary-side rectifier, and $R_{ds}$ is a source-drain resistance of the secondary-side rectifier.

6. A control system of a flyback power supply having a primary-side feedback in a continuous conduction mode (CCM), the flyback power supply having the primary-side feedback comprising:

a primary side of a transformer comprising a primary-side winding, a primary-side switching transistor, and a primary-side current sampling resistor connected in series to the primary-side switching transistor;

a secondary side of the transformer comprising a secondary-side winding and a secondary-side rectifier; and an auxiliary winding;

wherein the control system comprises:

a single-output digital to analog converter (DAC) midpoint sampling module configured to sample a voltage signal $V_{sense}(t_{mid})$ on the auxiliary winding at a midpoint instant $T_r/2$ of a secondary-side current reset time $T_r$;

a digital control module configured to calculate an error $e(n)$ between the voltage signal $V_{sense}(t_{mid})$ and a system-predetermined fixed value $V_{REF}$, calculate an input voltage control amount $V_c(n)$ for a PWM driving module by using proportion and integration according to the error $e(n)$, and obtain a digital value $V_{peak\_d}$ of a peak voltage on the primary-side current sampling resistor $R_{cs}$ according to the error $e(n)$;

a current detection module configured to obtain a primary-side average current $J_{mid\_p}$ and a secondary-side average current $I_x(t_{mid})$ in the CCM indirectly by sampling and calculating through a digital-to-analog conversion according to the digital value $V_{peak\_d}$ and a voltage $V_{cs}$ at two terminals of the primary-side current sampling resistor $R_{cs}$;

a deadtime calculation module configured to calculate a deadtime $t_d$ between a turn-off of the secondary-side rectifier and a turn-on of the primary-side switching transistor according to the secondary-side average current $I_x(t_{mid})$; and the PWM driving module configured to generate a primary-side duty cycle control signal duty and a secondary-side duty cycle control signal duty_SR according to the deadtime $t_d$ and the input voltage control amount $V_c(n)$, control switching of the primary-side switching transistor according to the primary-side duty cycle control signal duty, and control switching of the secondary-side rectifier according to the secondary-side duty cycle control signal duty_SR.

7. The control system of claim 6, wherein the single-output DAC midpoint sampling module comprises:

a first DAC, a triangular wave generator, a first comparator CMP1, a second comparator CMP2, a counter, and a feedback amount calculation module;

wherein a voltage signal $V_{sense}$ on the auxiliary winding is configured to input as input signals to a positive terminal of the first comparator CMP1 and a positive terminal of the second comparator CMP2, respectively;

after superimposition of a digital single sloping wave output by the triangular wave generator and an analog reference voltage output by the first DAC, a voltage signal $V_{ref\_slope}$ of a single slope digital wave is obtained and is configured to input to a negative terminal of the first comparator CMP1;

a negative terminal of the second comparator CMP2 is connected to zero voltage;

the first comparator CMP1 is configured to output a feedback comparison signal $V_{ref\_comp}$ to the counter, and the second comparator CMP2 is configured to output a zero-crossing comparison signal $V_{zvs\_comp}$ to the counter;

the counter is configured to count to obtain values of $\Delta t_{r\_half}$ and $T_r$ according to changes between high levels and low levels of the feedback comparison signal $V_{ref\_comp}$ and the zero-crossing comparison signal $V_{zvs\_comp}$, wherein $\Delta t_{r\_half}$ is a total time required for the voltage signal $V_{ref\_slope}$ of the single slope digital wave to rise from a position of an initial voltage $V_{initial}$ to a position crossing the voltage signal $V_{sense}$ on the auxiliary winding, and $T_r$ is a reset time required for the secondary-side current to drop from a peak value to a lowest point;

according to a difference between the values of $\Delta t_{r\_half}$ and $T_r$, the feedback amount calculation module is configured to output a feedback signal $V_{ref\ initial}$ to an input terminal of the triangular wave generator and an input terminal of the first DAC, and adjust a digital value of the initial voltage $V_{initial}$ for a next cycle;

when the voltage signal $V_{sense}$ on the auxiliary winding is equal to the voltage signal $V_{ref\_slope}$ of the single slope digital wave, an instant value of the voltage signal $V_{ref\_slope}$ of the single slope digital wave is assigned to the voltage signal $V_{sense}(t_{mid})$ to output as an output signal of the single-output DAC midpoint sampling module in a current switching cycle.

8. The control system of claim 6, wherein the current detection module comprises:

a single-input double-output DAC, a third comparator CMP3, a fourth comparator CMP4, a primary-side current time counting module, and a secondary-side average current calculation module;

wherein the single-input double-output DAC and the secondary-side average current calculation module are configured to receive the digital value $V_{peak\_d}$ output by the digital control module;

a positive terminal of the third comparator CMP3 and a positive terminal of the fourth comparator CMP4 are configured to receive the voltage $V_{cs}$; a voltage analog value $V_{peak}$ on the primary-side current sampling resistor corresponds to a primary-side peak current output by a first output terminal of the single-input double-output DAC, and the voltage analog value $V_{peak}$ is configured to output to a negative terminal of the third comparator CMP3;

a second output terminal of the single-input double-output DAC is configured to output $V_{peak\_half}$, wherein $V_{peak\_half}=k \cdot V_{peak}$, $0<k<1$, and the $V_{peak\_half}$ is configured to output to a negative terminal of the fourth comparator CMP4;

the third comparator CMP3 is configured to output a comparison signal $V_{cmp3}$ to a first counter of the primary-side current time counting module, and the fourth comparator CMP4 is configured to output a comparison signal $V_{cmp4}$ to a second counter of the primary-side current time counting module;

according to changes of high levels and low levels of the comparison signal $V_{cmp3}$ and the comparison signal $V_{cmp4}$, the primary-side current time counting module is configured to obtain a time $T_q$ required by a linear increase of a primary-side current from zero amp or an initial current to a peak current in a DCM and a time $t_b$, required by a linear increase of the primary-side current from zero amp or the initial current to the peak current in the CCM, and output the times $t_a$ and $t_b$ to the secondary-side average current calculation module;

the secondary-side average current calculation module is configured to divide the digital value $V_{peak\_d}$ by a resistance of the primary-side current sampling resistor $R_{cs}$ to obtain a digital value $I_{peak\_p}$ corresponding to a peak current of a primary-side winding inductor, and the digital value $I_{peak\_p}$ is substituted into an expression of $I_s(t_{mid})$ along with the times $t_a$ and $t_b$;

$$I_s(t_{mid}) = \frac{N_p}{N_s} \cdot \frac{(1+k)t_b - (1-k)t_a}{2t_b} \cdot I_{peak\_p},$$

wherein $N_p$ and $N_s$ denote a number of turns of the primary-side winding and the secondary-side winding of the transformer, respectively, and the secondary-side average current $I_s(t_{mid})$ in the CCM is obtained and output.

9. The control system of claim 6, wherein the deadtime calculation module is configured to calculate the deadtime $t_d$ according to following formulas:

$$t_d = K_1 + K_2 + K_3 + f(I_s),$$

$$K_1 = R_g \frac{Q_g - Q_{gd} - Q_{gs}}{U_{GS} - U_P} \ln\left(\frac{U_g}{U_P}\right),$$

$$K_2 = \frac{R_g}{U_P} Q_{gd},$$

$$K_3 = -\frac{2R_g}{U_P} \sqrt{U_{dg}(t)} \, C_{rss}(t) \sqrt{U_{DS} - I_L R_{ds} - U_T},$$

$$f(I_s) = m - \frac{n}{m} I_s - \frac{n^2}{2m^3} I_s^2,$$

$$m = \sqrt{U_X - U_T}, \, n = R_{ds},$$

in the above formulas, $U_p$ is a Miller plateau voltage, $U_g$ is a gate voltage of the secondary-side rectifier, $R_q$ is a gate resistance of the secondary-side rectifier, $Q_g$ is a total dissipation charge amount by the gate during the turn-off of the secondary-side rectifier, $Q_{gd}$ is a dissipation charge amount of the gate in a Miller effect phase during the turn-off of the secondary-side rectifier, $Q_{gs}$ is a dissipation charge amount of the gate in a phase that $U_{gs}$ decreases from the Miller plateau voltage $U_p$ to 0 during the turn-off of the secondary-side rectifier, $I_L$ is a load current, $U_{ds}$, is an input voltage of the secondary-side rectifier, $C_{rss}$ is a reverse transfer capacitance of the secondary-side rectifier, $I_s$ is a secondary-side current, $U_X$ is an experimental measurement, $U_T$ : is a threshold voltage of the secondary-side rectifier, and $R_{ds}$ is a source-drain resistance of the secondary-side rectifier.

10. The control system of claim 6, wherein the PWM driving module comprises:

a sixth comparator, an inverter, a D flip-flop, an OR-gate, and a PWM driving unit;

wherein a positive input terminal of the sixth comparator is configured to receive the deadtime $t_d$, and a negative input terminal of the sixth comparator is connected to zero voltage;

an output terminal of the sixth comparator is connected to an input terminal of the inverter;

an output terminal of the inverter is connected to a D-input terminal of the D flip-flop;

an input signal of the PWM driving unit is the input voltage control amount $V_c(n)$;

a first output terminal of the PWM driving unit is configured to output the primary-side duty cycle control signal duty, and a second output terminal of the PWM driving unit is configured to output a signal duty_SRI to a clock control terminal of the D flip-flop;

a Q-output terminal of the D flip-flop is connected to one input terminal of the OR-gate, the signal duty_SRI is configured to input to the other input terminal of the OR-gate, and an output terminal of the OR-gate is configured to output the secondary-side duty cycle control signal duty_SR.

11. The control system of claim 6, wherein the secondary-side rectifier is a metal oxide semiconductor (MOS) transistor.

12. The control system of claim 6, wherein the primary-side switching transistor is a MOS transistor, and the primary-side current sampling resistor is connected in series between a source of the primary-side switching transistor and ground.

13. A method of controlling a flyback power supply having a primary-side feedback in a continuous conduction mode (CCM), the flyback power supply having the primary-side feedback comprising:
  a primary side of a transformer comprising a primary-side winding, a primary-side switching transistor, and a primary-side current sampling resistor connected in series to the primary-side switching transistor;
  a secondary side of the transformer comprising a secondary-side winding and a secondary-side rectifier; and
  an auxiliary winding;
  wherein the method comprises:
    sampling a voltage signal $V_{sense}(t_{mid})$ on the auxiliary winding at a midpoint instant $T_r/2$ of a secondary-side current reset time $T_r$;
    calculating an error $e(n)$ between the voltage signal $V_{sense}(t_{mid})$ and a system-predetermined fixed value $V_{REF}$, calculating an input voltage control amount $V_c(n)$ for a PWM driving module by using proportion and integration according to the error $e(n)$, and obtaining a digital value $V_{peak\_d}$ of a peak voltage on the primary-side current sampling resistor $R_{cs}$ according to the error $e(n)$;
    obtaining a primary-side average current $I_{mid\_p}$ and a secondary-side average current $I_s(t_{mid})$ in the CCM indirectly by sampling and calculating through a digital-to-analog conversion according to the digital value $V_{peak\_d}$ and a voltage $V_{cs}$ at two terminals of the primary-side current sampling resistor $R_{cs}$;
    calculating a deadtime $t_d$ between a turn-off of the secondary-side rectifier and a turn-on of the primary-side switching transistor according to the secondary-side average current $I_s(t_{mid})$;
    generating, by the PWM driving module, a primary-side duty cycle control signal duty and a secondary-side duty cycle control signal duty_SR according to the deadtime $t_d$ and the input voltage control amount $V_c(n)$; and
    controlling switching of the primary-side switching transistor according to the primary-side duty cycle control signal duty, and controlling switching of the secondary-side rectifier according to the secondary-side duty cycle control signal duty_SR.

14. The method of claim 13, wherein the step of sampling the voltage signal $V_{sense}(t_{mid})$ on the auxiliary winding at the midpoint instant $T_r/2$ of the secondary-side current reset time $T_r$ comprises:
  inputting, by a positive terminal of a first comparator CMP1, a voltage signal $V_{sense}$ on the auxiliary winding, after superimposition of a digital single sloping wave output by a triangular wave generator and an analog reference voltage output by a first DAC, obtaining a voltage signal $V_{ref\_slope}$ of a single slope digital wave to output to a negative terminal of the first comparator CMP1, and outputting, by the first comparator CMP1, a feedback comparison signal $V_{ref\_comp}$;
  inputting, by a positive terminal of a second comparator CMP2, the voltage signal $V_{sense}$ on the auxiliary winding, inputting, by a negative terminal of the second comparator CMP2, zero voltage, and outputting, by the second comparator CMP2, a zero-crossing comparison signal $V_{zvs\_comp}$;
  counting to obtain values of $\Delta t_{r\_half}$ and $T_r$ according to changes between high levels and low levels of the feedback comparison signal $V_{ref\_comp}$ and the zero-crossing comparison signal $V_{zvs\_comp}$, wherein $\Delta t_{r\_half}$ is a total time required for the voltage signal $V_{ref\_slope}$ of the single slope digital wave to rise from a position of an initial voltage $V_{initial}$ to a position crossing the voltage signal $V_{sense}$ on the auxiliary winding, and $T_r$ is a reset time required for a secondary-side current to drop from a peak value to a lowest point;
  outputting a feedback signal $V_{ref\_initial}$ to an input terminal of the triangular wave generator and an input terminal of the first DAC, and adjusting a digital value of the initial voltage $V_{initial}$ for a next cycle according to a difference between the values of $\Delta t_{r\_half}$ and $T_r$; and
  assigning, when the voltage signal $V_{sense}$ on the auxiliary winding is equal to the voltage signal $V_{ref\_slope}$ of the single slope digital wave, an instant value of the voltage signal $V_{ref\_slope}$ of the single slope digital wave to the voltage signal $V_{sense}(t_{mid})$.

15. The method of claim 13, wherein the step of obtaining the primary-side average current $I_{mid\_p}$ and the secondary-side average current $I_s(t_{mid})$ in the CCM indirectly by sampling and calculating through the digital-to-analog conversion according to the digital value $V_{peak\_d}$ and the voltage $V_{cs}$ at the two terminals of the primary-side current sampling resistor $R_{cs}$ comprises:
  receiving, by a positive terminal of a third comparator CMP3 and a positive terminal of a fourth comparator CMP4, the voltage $V_{cs}$;
  performing a digital-to-analog conversion on the digital value $V_{peak\_d}$ to obtain a voltage analog value $V_{peak}$ on the primary-side current sampling resistor corresponding to a primary-side peak current and output the voltage analog value $V_{peak}$ to a negative terminal of the third comparator CMP3, and to obtain $V_{peak\_half}$ and output the $V_{peak\_half}$ to a negative terminal of the fourth comparator CMP4, wherein $V_{peak\_half} = k \cdot V_{peak}$, $0 < k < 1$;
  obtaining, according to changes between high levels and low levels of a comparison signal $V_{cmp3}$ output by the third comparator CMP3 and changes between high levels and low levels of a comparison signal $V_{cmp4}$ output by the fourth comparator CMP4, a time $t_a$ required by a linear increase of a primary-side current from zero amp or an initial current to a peak current in a DCM and a time $t_b$ required by a linear increase of the primary-side current from zero amp or the initial current to the peak current in the CCM;
  dividing the digital value $V_{peak\_d}$ by a resistance of the primary-side current sampling resistor $R_{cz}$ to obtain a digital value $I_{peak\_p}$ of a peak current of a primary-side winding inductor; and
  substituting the digital value $I_{peak\_p}$, the times $t_a$ and $t_b$ into an expression of $I_s(t_{mid})$:

$$I_s(t_{mid}) = \frac{N_p}{N_s} \cdot \frac{(1+k)t_b - (1-k)t_a}{2t_b} \cdot I_{peak\_p},$$

wherein $N_p$ and $N_s$ denote a number of turns of the primary-side winding and the secondary-side winding of the transformer, respectively, to obtain the secondary-side average current $I_s(t_{mid})$ in the CCM.

16. The method of claim 13, wherein during the step of calculating the deadtime $t_d$ between the turn-off of the secondary-side rectifier and the turn-on of the primary-side switching transistor according to the secondary-side average current $I_s(t_{mid})$, the deadtime $T_d$ is calculated according to following formulas:

$$t_d = K_1 + K_2 + K_3 + f(I_s),$$

$$K_1 = R_g \frac{Q_g - Q_{gd} - Q_{gs}}{U_{GS} - U_P} \ln\left(\frac{U_g}{U_P}\right),$$

$$K_2 = \frac{R_g}{U_P} Q_{gd},$$

$$K_3 = -\frac{2R_g}{U_P} \sqrt{U_{dg}(t)} \, C_{rss}(t) \sqrt{U_{DS} - I_L R_{ds} - U_T},$$

$$f(I_s) = m - \frac{n}{m} I_s - \frac{n^2}{2m^3} I_s^2,$$

$$m = \sqrt{U_X - U_T}, n = R_{ds},$$

in the above formulas, $U_p$ is a Miller plateau voltage, $U_g$ is a gate voltage of the secondary-side rectifier, $R_g$ is a gate resistance of the secondary-side rectifier, $Q_g$ is a total dissipation charge amount of the gate during the turn-off of the secondary-side rectifier, $Q_{gd}$ is a dissipation charge amount of the gate in a Miller effect phase during the turn-off of the secondary-side rectifier, $Q_{gs}$ is a dissipation charge amount of the gate in a phase that $U_{gs}$ decreases from the Miller plateau voltage $U_p$ to 0 during the turn-off of the secondary-side rectifier, $I_L$ is a load current, $U_{ds}$ is an input voltage of the secondary-side rectifier, $C_{rss}$ is a reverse transfer capacitance of the secondary-side rectifier, $I_s$ is a secondary-side current, is an experimental measurement, $U_T$ is a threshold voltage of the secondary-side rectifier, and $R_{ds}$ is a source-drain resistance of the secondary-side rectifier.

\* \* \* \* \*

UNITED STATES PATENT AND TRADEMARK OFFICE
CERTIFICATE OF CORRECTION

PATENT NO. : 11,557,959 B2
APPLICATION NO. : 16/959015
DATED : January 17, 2023
INVENTOR(S) : Shen Xu et al.

It is certified that error appears in the above-identified patent and that said Letters Patent is hereby corrected as shown below:

In the Claims

Claim 1, Column 21, Line 4, "current $I_x(t_{mid})$ as an output signal to the deadtime" should be --current $I_s(t_{mid})$ as an output signal to the deadtime--.
Claim 2, Column 21, Line 44, "levels and low levels of the feedback comparison signal" should be --levels and low levels of the feedback comparison signal $V_{ref\_comp}$--.
Claim 2, Column 21, Line 47, "$\Delta t_{r\ half}$ is a total time required for the voltage signal" should be --$\Delta t_{r\_half}$ is a total time required for the voltage signal--.
Claim 2, Column 21, Line 54, "output a feedback signal $V_{ref\ initial}$ to be connected to an" should be --output a feedback signal $V_{ref\_initial}$ to be--.
Claim 2, Column 21, Line 59, "a difference between the values of $\Delta t_{r\ half}$ and $T_r$; and" should be --a difference between the values of $\Delta t_{r\_half}$ and $T_r$; and--.
Claim 4, Column 22, Line 58, "comparison signals and $V_{cmp3}$ and $V_{cmp4}$ of the com-" should be --comparison signals $V_{cmp3}$ and $V_{cmp4}$ of the com- --.
Claim 4, Column 23, Line 10, "$I_{peak\,p}$ of a primary-side winding inductor, and the" should be --$I_{peak\_p}$ of a primary-side winding inductor, and the--.
Claim 4, Column 23, Line 11, "digital value corresponding to the peak current $I_{peak\,p}$" should be --digital value corresponding to the peak current $I_{peak\_p}$--.
Claim 6, Column 24, Line 21, "mary-side average current $J_{mid\,p}$ and a secondary-side" should be --mary-side average current $I_{mid\_p}$ and a secondary-side--.
Claim 6, Column 24, Line 22, "average current $I_x(t_{mid})$ as in the CCM indirectly by sam-" should be --average current $I_s(t_{mid})$ as in the CCM indirectly by sam- --.
Claim 6, Column 24, Line 31, "rent $I_x(t_{mid})$; and" should be --rent $I_s(t_{mid})$; and--.
Claim 7, Column 24, Line 64, "$\Delta t_{r\ half}$ and $T_r$ according to changes between high levels" should be --$\Delta t_{r\_half}$ and $T_r$ according to changes between high levels--.
Claim 7, Column 24, Line 67, "$V_{zvs\_comp}$, wherein $\Delta t_{r\ half}$ is a total time required for the" should be --$V_{zvs\_comp}$, wherein $\Delta t_{r\_half}$ is a total time required for the--.
Claim 7, Column 25, Line 7, "according to a difference between the values of $\Delta t_{r\ half}$ and" should be --according to a difference between the values of $\Delta t_{r\_half}$ and--.

Signed and Sealed this
Sixth Day of February, 2024

Katherine Kelly Vidal
*Director of the United States Patent and Trademark Office*

CERTIFICATE OF CORRECTION (continued)
U.S. Pat. No. 11,557,959 B2

Claim 7, Column 25, Line 9, "ured to output a feedback signal $V_{ref\ initial}$ to an input" should be --ured to output a feedback signal $V_{ref\_initial}$ to an input--.

Claim 8, Column 25, Line 54, "is configured to obtain a time $T_q$ required by a linear" should be --is configured to obtain a time $t_a$ required by a linear--.

Claim 8, Column 25, Line 56, "initial current to a peak current in a DCM and a time $t_b$," should be --initial current to a peak current in a DCM and a time $t_b$--.

Claim 8, Column 25, Line 64, "$R_{cs}$ to obtain a digital value $I_{peak\,p}$ corresponding to a" should be --$R_{cs}$ to obtain a digital value $I_{peak\_p}$ corresponding to a--.

Claim 8, Column 25, Line 67, "of $I_x(t_{mid})$ along with the times $t_a$ and $t_b$;" should be --of $I_s(t_{mid})$ along with the times $t_a$ and $t_b$:--.

Claim 8, Column 25, Line 66, "the digital value $I_{peak\,p}$ is substituted into an expression" should be --the digital value $I_{peak\_p}$ is substituted into an expression--.

Claim 9, Column 26, Line 29, "a gate voltage of the secondary-side rectifier, $R_q$ is a gate" should be --a gate voltage of the secondary-side rectifier, $R_g$ is a gate--.

Claim 9, Column 26, Line 37, "side rectifier, $I_L$ is a load current, $U_{ds}$, is an input voltage of" should be --side rectifier, $I_L$ is a load current, $U_{ds}$ is an input voltage of--.

Claim 9, Column 26, Line 40, "current, $U_X$ is an experimental measurement, $U_T$ : is a" should be --current, $U_X$ is an experimental measurement, $U_T$ is a--.

Claim 10, Column 26, Line 60, "driving unit is configured to output a signal $duty\_SRl$" should be --driving unit is configured to output a signal $duty\_SR1$--.

Claim 10, Column 26, Line 63, "input terminal of the OR-gate, the signal $duty\_SRl$ is" should be --input terminal of the OR-gate, the signal $duty\_SR1$ is--.

Claim 13, Column 27, Line 32, "obtaining a primary-side average current $I_{mid\,p}$ and a" should be --obtaining a primary-side average current $I_{mid\_p}$ and a--.

Claim 14, Column 28, Line 4, "counting to obtain values of $\Delta t_{r\ half}$ and $T_r$ according to" should be --counting to obtain values of $\Delta t_{r\_half}$ and $T_r$ according to--.

Claim 14, Column 28, Line 7, "crossing comparison signal $V_{zvs\_comp}$, wherein $\Delta t_{r\ half}$ is" should be --crossing comparison signal $V_{zvs\_comp}$, wherein $\Delta t_{r\_half}$ is--.

Claim 14, Column 28, Line 15, "outputting a feedback signal $V_{ref\ initial}$ to an input terminal" should be --outputting a feedback signal $V_{ref\_initial}$ to an input terminal--.

Claim 14, Column 28, Line 19, "difference between the values of $\Delta t_{r\ half}$ and $T_r$; and" should be --difference between the values of $\Delta t_{r\_half}$ and $T_r$; and--.

Claim 15, Column 28, Line 26, "the primary-side average current $I_{mid\,p}$ and the secondary-" should be --the primary-side average current $I_{mid\_p}$ and the secondary- --.

Claim 15, Column 28, Line 34, "CMP4, the voltage $V_{cs}1$" should be --CMP4, the voltage $V_{cs}$;--.

Claim 15, Column 28, Line 54, "primary-side current sampling resistor $R_{cz}$ to obtain a" should be --primary-side current sampling resistor $R_{cs}$ to obtain a--.

Claim 15, Column 28, Line 55, "digital value $I_{peak\,p}$ of a peak current of a primary-side" should be --$R_{cs}$ to obtain a digital value $I_{peak\_p}$ corresponding to a--.

Claim 15, Column 28, Line 57, "substituting the digital value $I_{peak\,p}$, the times $t_a$ and $t_b$ into" should be --substituting the digital value $I_{peak\_p}$, the times $t_a$ and $t_b$ into--.

Claim 15, Column 28, Line 67, "current $I_x(t_{mid})$ in the CCM" should be --current $I_s(t_{mid})$ in the CCM--.

Claim 16, Column 29, Line 5, "current $I_s(t_{mid})$, the deadtime $T_d$ is calculated according to" should be --current $I_s(t_{mid})$, the deadtime $t_d$ is calculated according to--.

Claim 16, Column 30, Line 19, "current, is an experimental measurement, $U_T$ is a threshold" should be --current, $U_X$ is an experimental measurement, $U_T$ is a threshold--.